United States Patent
Hughes et al.

(10) Patent No.: US 8,109,819 B2
(45) Date of Patent: Feb. 7, 2012

(54) INTERNET CONTEST

(75) Inventors: John M. Hughes, Hebron, CT (US); Michael Lydon, Hebron, CT (US); John Clayton Bollinger, Bloomington, IN (US); Sarah Charlene Ramkissoon, North York (CA); Donald Cruver, Wallkill, NY (US)

(73) Assignee: TopCoder, Inc., Glastonbury, CT (US)

( * ) Notice: Subject to any disclaimer, the term of this patent is extended or adjusted under 35 U.S.C. 154(b) by 1335 days.

(21) Appl. No.: 11/707,636

(22) Filed: Feb. 16, 2007

(65) Prior Publication Data

US 2007/0226062 A1    Sep. 27, 2007

Related U.S. Application Data

(60) Provisional application No. 60/775,180, filed on Feb. 21, 2006, provisional application No. 60/857,850, filed on Nov. 10, 2006.

(51) Int. Cl.
*A63F 9/24* (2006.01)

(52) U.S. Cl. .................. 463/9; 463/42; 273/430

(58) Field of Classification Search ............. 463/9, 42; 273/430
See application file for complete search history.

(56) References Cited

U.S. PATENT DOCUMENTS

| | | | |
|---|---|---|---|
| 4,619,457 A | 10/1986 | Small | |
| 5,035,625 A | 7/1991 | Munson et al. | |
| 5,083,800 A | 1/1992 | Lockton | |
| 5,586,937 A | 12/1996 | Menashe | |
| 5,643,088 A | 7/1997 | Vaughn | |
| 5,679,075 A | 10/1997 | Forrest et al. | |
| 5,712,979 A | 1/1998 | Graber et al. | |
| 5,774,870 A | 6/1998 | Storey | |
| 5,791,991 A | 8/1998 | Small | |
| 5,794,210 A | 8/1998 | Goldhaber | |
| 5,796,952 A | 8/1998 | Davis et al. | |
| 5,848,396 A | 12/1998 | Gerace | |
| 5,937,392 A | 8/1999 | Alberts | |
| 5,942,969 A | 8/1999 | Wicks | |
| 5,948,061 A | 9/1999 | Merriman | |
| 5,991,735 A | 11/1999 | Gerace | |
| 5,999,912 A | 12/1999 | Wodarz et al. | |
| 6,006,197 A | 12/1999 | d'Eon et al. | |
| 6,009,410 A | 12/1999 | LeMole et al. | |
| 6,009,412 A | 12/1999 | Storey | |
| 6,012,984 A | 1/2000 | Roseman | |
| 6,014,698 A | 1/2000 | Griffiths | |
| 6,016,504 A | 1/2000 | Arnold et al. | |
| 6,036,601 A | 3/2000 | Heckel | |

(Continued)

OTHER PUBLICATIONS

Web page archive of www.freeride.com/media/ftc.html dated Aug. 16, 2000 by archive.org, available at http://web.archive.org/web/20000816002151/http://www.freeride.com/media/ftc.html, as downloaded Dec. 4, 2008 (1 page).

(Continued)

*Primary Examiner* — Omkar Deodhar
(74) *Attorney, Agent, or Firm* — Goodwin Procter LLP

(57) ABSTRACT

In general, the invention relates to providing infrastructure, process controls, and software to design, advertise, and implement an on-line contest in which participants in the contest search the Internet for a target in order to earn a reward. Hints and/or hidden objects may provide clues as to where to look for the reward, how to claim the reward, and what the reward is. The reward is funded by participating web site owners who reserve, in some embodiments via an auction, the opportunity to "host" the target during a contest or a portion of a contest, and as a result, drive traffic to their respective web sites.

17 Claims, 13 Drawing Sheets

U.S. PATENT DOCUMENTS

| | | | |
|---|---|---|---|
| 6,039,244 | A | 3/2000 | Finsterwald |
| 6,061,660 | A | 5/2000 | Eggleston et al. |
| 6,074,299 | A | 6/2000 | Cohen |
| 6,085,176 | A | 7/2000 | Woolston |
| 6,102,406 | A | 8/2000 | Miles et al. |
| 6,178,408 | B1 | 1/2001 | Copple et al. |
| 6,183,366 | B1 | 2/2001 | Goldberg et al. |
| 6,193,610 | B1 | 2/2001 | Junkin |
| 6,196,920 | B1 | 3/2001 | Spaur |
| 6,224,486 | B1 | 5/2001 | Walker et al. |
| 6,251,017 | B1 | 6/2001 | Leason et al. |
| 6,257,896 | B1 | 7/2001 | Fargano |
| 6,266,651 | B1 | 7/2001 | Woolston |
| 6,267,675 | B1 | 7/2001 | Lee |
| 6,285,985 | B1 | 9/2001 | Horstmann |
| 6,306,035 | B1 | 10/2001 | Kelly et al. |
| 6,324,519 | B1 | 11/2001 | Eldering |
| 6,364,765 | B1 | 4/2002 | Walker et al. |
| 6,454,648 | B1 | 9/2002 | Kelly et al. |
| 6,532,448 | B1 | 3/2003 | Higginson et al. |
| 6,564,208 | B1 | 5/2003 | Littlefield et al. |
| 6,606,745 | B2 | 8/2003 | Maggio |
| 6,612,501 | B1 | 9/2003 | Woll et al. |
| 6,631,404 | B1 | 10/2003 | Philyaw |
| 6,632,142 | B2 | 10/2003 | Keith |
| 6,636,892 | B1 | 10/2003 | Philyaw |
| 6,650,952 | B1 | 11/2003 | Garcia et al. |
| 6,749,511 | B2 | 6/2004 | Day |
| 6,769,990 | B2 | 8/2004 | Cohen |
| 6,791,588 | B1 | 9/2004 | Philyaw |
| 6,898,411 | B2 | 5/2005 | Ziv-el et al. |
| 6,937,996 | B1 | 8/2005 | Forsythe et al. |
| 7,054,831 | B2 | 5/2006 | Koenig |
| 7,085,732 | B2 | 8/2006 | Gould |
| 7,162,433 | B1 | 1/2007 | Foroutan |
| 2005/0027596 | A1 | 2/2005 | Bender et al. |

OTHER PUBLICATIONS

Cybergold, Inc., Form S-1 General form for registration of securities under the Securities Act of 1933, filed May 21, 1999, available at http://www.sec.gov/Archives/edgar/data/1086937/0000950149-99-001021-index.html, as downloaded Dec. 4, 2008, pp. 5-7, 38-48.

Web page, "Storage" on Active Wiki web site, available at http://wiki.activeworlds.com/index.php?title=Storage, as downloaded Dec. 4, 2008 (2 pages).

<p>

Welcome to Company Employment Opportunities, your source for full time and contract driving work. Finally, the time has come for drivers of the world to reap the benefits of our Opportunities.
<br/><br/>
We are aggressively seeking out companies that have a strong need for the level of talent that only Company drivers can provide. Company does all of the leg work for you - we find the companies, look for the right positions and when we find a match, we present you with the opportunity. Only after you confirm your interest in a particular position will Company pass on your information to the appropriate hiring manager. Before you even talk to the company's representative, Company will make sure your salary requirements, job requirements, and relocation requests are met. Best of all, Company provides this service for full time and contract work at no cost to you.
<br/><a bb/a329fe41ca34acce362901></a><br/>

Company currently has several clients looking to hire. Register <a href="/xx?module=ContractingPreferences">here</a> to provide us with your salary and travel requirements and rate your experience. Then let Company work for you!
<br/><br/>
</p>
<p span class="bigRed">Please note that your placement information will only be accessible by Company personnel. Company will NOT submit your information to any company without your prior approval.
<META name="bb-hint" content="{YOU'RE GETTING CLOSER!!}"> </p>

</div>
<p><br/></p>
</td>

EMPLOYMENT OPPORTUNITIES

Welcome to Company Employment Opportunities, your source for full time and contract driving work. Finally, the time has come for drivers of the world to reap the benefits of our Opportunities.

We are aggressively seeking out companies that have a strong need for the level of talent that only Company drivers can provide. Company does all of the leg work for you - we find the companies, look for the right positions and when we find a match, we present you with the opportunity. Only after you confirm your interest in a particular position will Company pass on your information to the appropriate hiring manager. Before you even talk to the company's representative, Company will make sure your salary requirements, job requirements, and relocation requests are met. Best of all, Company provides this service for full time and contract work at no cost to you.

Company currently has several clients looking to hire. Register Contracting Preferences here to provide us with your salary and travel requirements and rate your experience. Then let Company work for you!

Please note that your placement information will only be accessible by Company personnel. Company will NOT submit your information to any company without your prior approval.
{YOU'RE GETTING CLOSER!!}

EMPLOYMENT OPPORTUNITIES

Welcome to Company Employment Opportunities, your source for full time and contract driving work. Finally, the time has come for drivers of the world to reap the benefits of our Opportunities.

We are aggressively seeking out companies that have a strong need for the level of talent that only Company drivers can provide. Company does all of the leg work for you - we find the companies, look for the right positions and when we find a match, we present you with the opportunity. Only after you confirm your interest in a particular position will Company pass on your information to the appropriate hiring manager. Before you even talk to the company's representative, Company will make sure your salary requirements, job requirements, and relocation requests are met. Best of all, Company provides this service for full time and contract work at no cost to you.

Company currently has several clients looking to hire. Register Contracting Preferences here to provide us with your salary and travel requirements and rate your experience. Then let Company work for you!

Please note that your placement information will only be accessible by Company personnel. Company will NOT submit your information to any company without your prior approval.

[YOU'RE GETTING CLOSER!!]

INTERNET CONTEST

CROSS-REFERENCE TO RELATED APPLICATIONS

This application claims priority to U.S. provisional patent application Ser. No. 60/775,180, filed on Feb. 21, 2006 and U.S. provisional patent application Ser. No. 60/857,850, filed on Nov. 10, 2006, the entire disclosures of which are incorporated herein by reference.

TECHNICAL FIELD

This invention relates to computer-based methods and systems for marketing and, more particularly, to methods and systems for providing an internet contest that directs participants to web sites.

BACKGROUND

The Internet and the world-wide-web allow people connected to the network to access virtually any other computer connected to the network. World-wide-web enabled software, referred to as a browser, allows users to view content residing on other devices connected to the network from virtually any device (e.g., a computer, a wireless hand-held device, a cellular telephone, etc.). For example, a user "navigates" to a particular site by providing a Uniform Resource Locator (URL) to the browser, and through an association of the URL with one or more network addresses (e.g., IP addresses), the user is connected to the site. Typically, the site includes one or more files ("web pages") that are presented to the user in response to her request. The compilation of these files (and often the URL or URLs associated with these files) is commonly called a "web site." In addition to including static text files, a web site can also be made up of multiple web pages (which in turn may comprise text and/or components from other web pages), dynamically generated pages, multimedia (e.g., audio, graphics, video) files, static objects, and executable components such as applets, scripts and the like.

As the Internet has evolved, companies realized its unique ability to reach and service a large number of customers (or potential customers) at a fraction of the cost of fully-staffed stores, live call centers, and conventional advertising vehicles (e.g., television, print, etc.) Once a company has a web site, it becomes desirable to attract visitors to its web site. On the Internet, that is typically done with search engines, or with advertising, in which ads are placed on web sites or in emails that direct users to other web sites. "Banner ads" take the form of rectangular spaces on a web page or other communication, containing whatever text or images an advertiser chooses to place within them. When selected by a user, the ad redirects a web browser from the web site or document that the user is currently viewing to that of the advertiser, or in some cases creates a new instantiation, window or tab of the web browser containing the target web site. Even more obtrusive are pop-up ads that appear on the user's screen and obscure the subject matter intended to be viewed when invoked by, for example, merely visiting a web page.

Though banner ads and pop-up ads are relatively inexpensive, users generally have no interest in, or reason, to click on such ads. Further, many users are sufficiently annoyed by banner ads and pop-ups that they will no longer visit web sites that include them, or install software that specifically targets and disables such ads. As a result the effectiveness of such ads is minimized.

There have been many different types of contests held over the Internet. There are games of chance and skill, as well as lotteries. Some web sites have hosted "scavenger hunts" in which users are challenged to identify information available on one or more web sites to complete a questionnaire. Typically, a user travels to a series of web sites and is encouraged to browse through the web site in search of information contained within that site. Upon finding the information and presenting to the scavenger hunt administrator (or other entity), the user is provided some form of reward. As such, the incentive for finding the hidden object functions as a typical banner ad would, by directing users to a preferred web site, and by causing them to search the site, increases the probability that the user will remain at the web site for more than some inconsequential amount of time.

However, such scavenger hunts require the owners and/or operators of the web sites to constantly update their sites with new "objects" for each new promotion or anytime the parameters of the promotion change. It also requires web site owners to promote or otherwise engage users to their scavenger hunt.

SUMMARY OF THE INVENTION

Many companies struggle to gain the attention of consumers using traditional advertising methods. This is especially true as it relates to advertising on the Internet. Traditional methods of on-line advertising, while inexpensive, provide questionable benefit, and may become targets of legislation specifically banning such ads. However, due to the pervasive nature of the Internet, the increased access to the Internet provided by mobile devices consumer electronics, and the like and the ability to sell products with very low overhead costs, companies still desire to maintain and advertise their online presence.

Further, the Internet allows large numbers of geographically dispersed people to participate in provide on-line contests without leaving their home or office. Also, the viral nature of the Internet provides the means for word-of-mouth advertising to reach a world-wide audience in a matter of days, if not hours. Promise of a reward (e.g., a monetary prize) for participating in such contests only furthers the excitement and increases the entertainment associated with a contest.

In general, the invention relates to providing infrastructure, techniques, process controls, and software to design, advertise, and implement an on-line contest in which participants in the contest search the Internet for a reward. Hints, puzzles and/or hidden objects may provide clues as to where to look for the reward, how to claim the reward, and what the reward is. The reward is funded by participating web site owners who reserve (in some embodiments via an auction) the opportunity to "host" the contest or a portion of a contest, and as a result, driving traffic to their web sites.

Generally speaking, the contest is implemented, in one exemplary implementation, by allocating segments of a contest to participating web sites for a fee and facilitating the inclusion of targets on the participating web sites based on the allocation. Contestants are provided with one or more hints as to the current and/or subsequent locations of a target, thus encouraging the participants to navigate to those web sites. Once a participant finds one or more targets (and in some cases performs a task such as solving a puzzle) she may be able to claim a reward. Contestants may also be provided with specialized contest software that is used to provide contest information and/or make a target apparent to a contestant.

In one aspect of the invention, a method for directing Internet traffic to web sites includes providing an auction among potential sponsors of an online scavenger hunt in which the potential sponsors bid on hosting the target of the scavenger hunt on their web site and selecting a sponsor (or sponsors) as winning sponsors. The method also includes providing the online scavenger hunt in which the target object (e.g., an icon, text, an HTML object or image) of the scavenger hunt is hosted by a web site of the winning sponsor and the participants navigate to the hosting web site (or sites) in search of the target object. As a result, Internet traffic is driven to the hosting web site.

The auction can be a blind auction (e.g., potential sponsors have no knowledge of other bids) or an open auction, in which winners are determined, for example, by selecting the highest bidder at a predetermined time or in some instances the first sponsor to bid a predetermined amount of money (which can differ for different portions of the scavenger hunt). The sponsors can host an entire scavenger hunt, some number of portions of the scavenger hunt that represent contest segments, and/or randomly selected contest segments, during which the target is hosted on the winning sponsor's web site. The contest segments can be fixed durations of equal time, or in some cases certain segments may be different durations of time. The segments can be attributed to a specific date and time (e.g., January 13$^{th}$ at 8:00 pm EST), a range (e.g., sometime between 8:00 pm and 10:00 pm EST), a particular order (e.g., the seventh contest segment) or to a particular event (e.g., halftime of the Super Bowl).

The navigation histories of contest participants can be tracked to determine, for example, which web sites the participants have visited, and prizes can be awarded accordingly. Prizes can be awarded to participants that visit all of the sponsored web sites or in some cases visit more sponsored web sites than other participants. Prizes can be awarded to participants who find targets on the hosted sites, solve puzzles on the sites and/or find tokens indicating they have visited the site. The prize can be based, for example, on the number of participants, the number of sponsors, or an amount of money bid to host the target of the scavenger hunt.

In some embodiments, the payments received from the sponsors is based on the number of participants that navigate to a particular web site or sites. The web sites can be attributed to a single domain (e.g., a private label contest hosted by one sponsor) or multiple domains.

In another aspect of the invention, a system for modifying the functionality of a web page includes client software running in a web browser used by a contestant in an online contest and a client interface server in communication with the client software. The client software presents added contest functionality to browsed web sites participating in the online contest and the client interface server determines if the web browser is presenting a web site participating in the online contest, and if so, transmits instructions to the client software to present the added contest functionality with the browsed web sites.

The client software may be a java applet or a contest information screen implemented, for example, using asynchronous javascript. The client software can be a toolbar that is added to a client application such as a web browser. In some cases, the client software is configured according to the Wireless Application Protocol standard, thus allowing the client software to operate on various wireless and/or handheld devices.

The contest can be, as one example, an online scavenger hunt in which participants navigate to web sites in search of a target object. The added contest functionality can be presentation of the target object, an interactive puzzle and/or contest status information such as the number of participants in the contest, a score board of current contest leaders, and/or prizes for winning the contest. In some embodiments, the added contest functionality allows contest participants to communicate among each other (using, for example, electronic messaging) during the contest.

The system may also include a data storage module for storing identifiers of the web sites participating in the contest. In some embodiments, the client software also transmits browser history data from the browser to the client interface server for storage in the data storage module, and, in some cases, subsequent analysis. The client interface server may, in certain instances, determine if the web browser is presenting a web site that is participating in the online contest by comparing identifiers of browsed web sites (which in some cases may be encrypted or otherwise somehow obscured or obfuscated using, for example, a Bloom filter) with the list of identifiers of participating web sites.

In another aspect of the invention, a system for facilitating communication among participants in an online contest includes client software running in a web browser used by participants in an online scavenger hunt to determine the current status of other participants in the online scavenger hunt, a contest server for receiving from the client software a status of the each of the participants using the client software and transmitting the current status of the participants (which in some cases may be a team of participants) to the client software, and a contest information component presented by the client software for displaying the current status of the participants.

The contest information component may be a toolbar, a downloadable javascript applet or an information screen implemented using, for example, asynchronous javascript. The contest server may also transmit a current status of the online scavenger hunt, as well as a current status of other online scavenger hunts. The status of the scavenger hunts may include, for example, the number of active and/or upcoming online scavenger hunts, announcements regarding upcoming scavenger hunts, the names of sponsors of the scavenger hunt, and/or the prizes available for winning the scavenger hunts. Instead of or in addition to the status information, the contest information component may also present advertisements to the contest participants.

The current status of the participants in the scavenger hunts can include the number of participants, a current prize, the number of participating web sites a participant has found, a time remaining in the scavenger hunt and/or a hint about the current location or future location of a target of the scavenger hunt. The contest information component may also include messaging functionality that allows participants to communicate with each other during the scavenger hunt. In some embodiments, a version of the contest information component is configured according to the Wireless Application Protocol, thereby allowing the component to be viewed on various handheld and wireless devices. The client software can also present additional functionality to the web sites participating in the scavenger hunt. For example, the software may facilitate the presentation of a target object, an interactive puzzle or in some cases, both.

In another aspect of the invention, a method for facilitating a team-based online scavenger hunt includes providing an online scavenger hunt in which a target object (such as an icon, text or an image) is hosted by web sites and in which participants in the online scavenger hunt navigate to the hosting web sites in search of the target object, and providing client software running in a web browser and used by the participants to communicate with other participants, thereby allowing the participants to cooperate with each other to find the target object.

The client software may be configured according to the Wireless Application Protocol standards and in some cases configured to facilitate communication among the team members. The participants may be organized into teams (either randomly, specifically selected by other team members, or assigned based on past performance) such that the members of each team can cooperate to find the target object. Prizes can be awarded to teams, by, for example, determining the number of hosting web sites found by each member of the teams and awarding the prize to the team finding the most hosting sites (which may be used to allocate the prize among team members) or, in some cases, the first team to find the target object. Each team member may be rated based on their performance in the online scavenger hunt.

The online scavenger hunt may be sponsored, and in some cases the opportunity to participate as a sponsor is awarded based on an online auction among potential sponsors that desire to have their web sites host some or all of the scavenger hunt, thereby driving Internet traffic to their web sites.

In yet another aspect of the invention, a method for providing online entertainment includes providing an online scavenger hunt in which participants collect a series of electronic keys with which they can claim a prize. More specifically, the method includes encouraging the participants to navigate to a web page, presenting an interactive screen in which the participant solves a puzzle (e.g., by unscrambling a scrambled word, determining the solution to a hangman game, and so forth), and upon determining the word, instructing the participant to locate the word on the web site. Once the participant has located the word, one of a series of tokens an identifier of a next web page may be presented to the participant. This process may be repeated until a predetermined stopping point (e.g., one participant collects all the tokens, or until a particular date and time), at which point an interactive target (such as an icon, text or image) may be presented to the participant. The collected tokens may be used to "unlock" the target.

In some embodiments, a prize (such as money) is awarded to the participant who collects the series of electronic keys. The prize can change (e.g., the prize may increase or decrease) during the online scavenger hunt. In some cases, sponsors may be solicited to sponsor part of or the entire scavenger hunt, and participants may be directed to web sites hosted by the participating sponsors. The solicitation may take place using, for example, an online auction. Advertisements may be presented to the participants during the scavenger hunt.

In another aspect of the invention, a method for determining if a web site is in a list of web sites includes obfuscating URLs associated with the web sites in the list by applying a Bloom Filter to each of the URLs, transmitting the list of obfuscated URLs to a client, transmitting a client plug-in to a web browser that receives the transmitted list, and for each web site visited by the web browser obfuscates the URL of the visited web site using the Bloom Filter, compares the obfuscated URL of the visited web site to the list of obfuscated web sites, and determines if the visited web site is in the list based on the results of the comparison.

The list of web sites can include web sites that are hosted by sponsors of an online scavenger hunt, and in some instances the list of obfuscated URLs is transmitted to the client in response to a request to participate in the scavenger hunt. In some embodiments, tokens are provided to the client if the comparison determines the visited web site to be in the list. The results of the comparison may also be displayed on the client, indicating to the user that the visited web site is in the list.

These and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 4 is an example of web site HTML code in a demonstrative example according to an embodiment of the invention.

FIG. 5 is an demonstrative web site display using the example HTML code of FIG. 4.

FIG. 6 is another demonstrative web site display using the example HTML code of FIG. 4.

DETAILED DESCRIPTION

Figure 1:
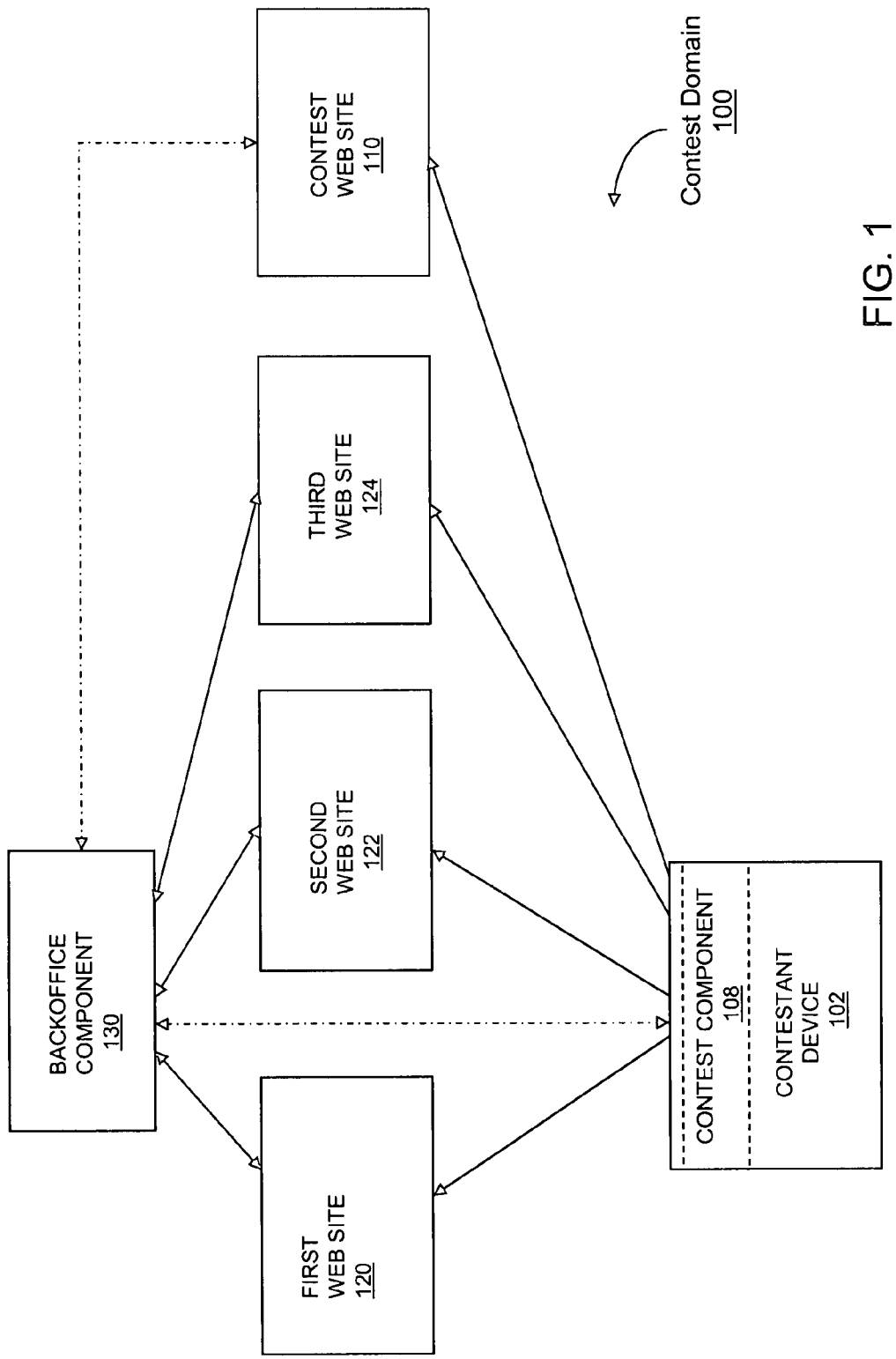
FIG. 1 is a block diagram of a contest system according to an embodiment of the invention.

Referring to FIG. 1, in one embodiment, a contest domain 100 includes a contestant device 102. The contestant device 102 may be implemented as a system including software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The contestant device 102 also could be implemented on such hardware as a smart or dumb terminal, network computer, wireless device, telephone, personal digital assistant, information appliance, workstation, minicomputer, mainframe computer, or some combination, or as another computing device, that is operated, for example, as a general purpose computer, or a special purpose hardware device used solely for serving as a contestant device 102 in the contest domain.

The contestant device 102 is used by an actual or potential contestant to access web sites. In one embodiment, a contestant uses a web browser, such as the FIREFOX browser from the Mozilla Foundation, INTERNET EXPLORER from Microsoft Corporation of Redmond, Wash., or the like, to access web sites. The contestant device 102 may access a contest administration web site 110, to learn details about the contest. The contest administration web site 110 may be integrated or separate from other web sites 120, 122, 124 that potentially may be accessed by a contestant. In one embodiment, the contest administration web site 110 provides information about how to participate in a contest.

A communications network connects the contestant device 102 with the servers 120, 122, 124 that provide the web sites 120, 122, 124. The communication may take place via any media or any combination of media such as standard telephone lines, LAN or WAN links (e.g., T1, T3, 56 kb, X.25), broadband connections (ISDN, Frame Relay, ATM), wireless links (cellular, 802.11, Bluetooth, etc.), and so on. Preferably, the network can carry TCP/IP protocol communications, and HTTP/HTTPS requests made by the contestant device 102 to the web sites 120, 122, 124. The type of network is not a limitation, however, and any suitable network(s) and protocol(s) may be used. Non-limiting examples of networks that can serve as or be part of the communications network include a wireless or wired Ethernet-based intranet, a local or wide-area network (LAN or WAN), cellular or land-based telephone networks, and/or the global communications network known as the Internet, which may accommodate many different communications media and protocols, and any variation or combination.

In one embodiment, the contest administration web site 110 makes available for download over the network a contest component 108 that can be used in conjunction with the contestant device 102. In some embodiments, no contest component 108 is needed at all, and in some embodiments, the use of a contest component 108 is optional. The contest component 130 may be implemented in various forms, for example, it may be in the form of a Java applet that is downloaded to the device 102 and runs in conjunction with a web browser, a "plug-in" or other extension or combination with the browser or the contestant device 102. The contest component may be in the form of a standalone application. The contest component may be implemented in a multi-platform language such as Java, in a scripting language such as JavaScript, and/or in native processor executable code, or in some other form. In some embodiments, the contest component 108 is built into the contestant device 102 or a browser installed on the contestant device 102.

In some embodiments, the contestant device 102 is used to navigate among and view screens, objects, maps and/or virtual "worlds" as part of online games such as MYST by UBISOFT and SECOND LIFE from LINDEN RESEARCH, INC. In some cases, the contest component 108 can provide additional functionality to the contestant device 102 (or other software components used to design and/or navigate within the game or virtual world) to allow users to view and/or interact with contest objects and clues. For example, users participating in an online game and/or virtual world simulation can simultaneously participate in the online contest such that they have an opportunity to win prizes and/or gain notoriety among other users that are also participating in the contest. For example, in one embodiment in which the contest takes place within a virtual world, the user navigates to various locations within the virtual world to find clues, puzzles, target objects and/or prizes. In some cases, the users can interact with other virtual participants and advertise the contest to increase participation and interest in the contest. In some embodiments, the contest may be implemented within virtual worlds specifically designed to host one or more contests, whereas in other circumstances the contests may be implemented within virtual worlds or games not specifically set up to host contests.

In some such embodiments, a contest component is an addition (e.g., a plug-in) to a game or virtual world component, which runs on a contest device. The plug in presents the contest in the context of the game or virtual world, in some implementations without a requirement that the game or virtual world server participate or provide the contest. The contest component may recognize objects in the virtual world, and provide the contest based on the presence of such objects. For example, an object, such as a ball, in a virtual world, may be the subject of a scavenger hunt, but the ball may be found inside, or on, other objects. The sponsors may desire to have visitors to their location in a virtual world, and so may request that the target be located within a particular room, building, or virtual area.

Generally speaking, in one embodiment, a contestant uses the contestant device 102, with or without the contest component 108, to obtain hints to a current and/or future location (e.g., exemplary web sites 120, 122, 124) where a target may be found. The contestant uses the hints and the contest component 108 to search for targets on different web sites. When a target is found, the user may submit it for a reward. In some embodiments, the contestant may need to perform additional tasks in order to gain a reward in addition to locating the target. For example, the user may need to specify additional information (e.g., answer a question, solve a puzzle, or other information) that can be used to gain a reward, or find additional targets. The hints to the information needed to collect the reward may be on the target, or provided with the target. In cases where multiple targets are needed to claim a reward, the contest component 108 and/or the contestant device 102 may track the contestant's web site visitations to confirm that he has in fact visited web sites and performed the requisite tasks to find and/or unlock the target on each web page. In one particular example, a key is created on the contestant device (in encrypted or decrypted form) for target that is found. Claiming the reward may require the presentation of the tokens, e.g., by the contest component 108 to the contest web site 110.

In one embodiment, a target may be visible to all viewers of the web site who visit the web site at a particular time. In another embodiment, the target may be visible only to viewers with a particular cookie or other identifier. In another embodiment, the target may be visible only to registered viewers, or to viewers that have the contest component 108 installed on the contestant device 102. In some embodiments, the target may be hiding within the web site or somehow obfuscated or camouflaged such that effort is needed to find the target.

In one embodiment, the contest administration web site 110 provides some information (e.g., hints) about where a contestant can find a target (not shown). In one embodiment, a target is a virtual object (e.g., text, image, and/or sound) that may be displayed on the pages of the web sites. The target may have a particular shape, for example, a geometric shape such as a ball or cube, or the shape of a fruit or animal. The target may have a particular color, texture, or shading. The target may have any readily recognizable form, such that someone looking for the form can find it. In some embodiments the target is all or a portion of a larger image, such as a recognizable product, person, character, logo or trademark.

The target may be instantly visible when the page is viewed, or there may be user action required, such as selection of a link, providing a key or other token, solving a puzzle, or moving a cursor over a location in a page. In one embodiment, the target is analogous to a virtual "box" or "ball" that needs to be opened by providing certain information to a web site or the contest component.

Hints provided by the contest administration web site 110, other web sites, or other media outlets (e.g., radio and/or television broadcasts, print ads, etc.) may provide references to a particular web site where the target may be found, or references to web sites where additional hints used to locate the target may be found. The hints may provide enough information individually to identify a web site (e.g., a URL), and where on a web site, the target may be located, or the hints may need to be combined with other hints in order to locate a target.

In some cases, a hint may be all or part of an image. The image may be any sort of image, including, without limitation, all or a portion of a web page, a logo or trademark, an item offered for purchase, a spokesperson, character, mascot, or some combination thereof. In some embodiments, a hint image is first provided with some missing information to contestants and the hint may be changed (e.g., replaced, modified, updated) over time to provide more information. For example, in one embodiment, the size of a hint image that is presented to contestants is initially very small such that it may be difficult to identify, but increases in size over time to make it easier to identify. For example, a hint may start as only a few pixels of a particular trademark, but increase by some number of pixels in each direction if no contestant finds the target. In other embodiments, certain distinctive elements (words, images, colors, etc.) of a logo are hidden and over time one or more features are revealed. In some cases, a hint may be a jumbled or scrambled image that may be reconstructed like a jigsaw puzzle. In one embodiment the image is broken up into square areas and reorganized. A participant can then arrange the pieces of the image in order to reveal the hint.

A hint may be a reference to an object (e.g., picture, word, or phrase) that is to be found. The hint may be provided in the form of the answer to a challenge, for example, as a puzzle, brainteaser, trivia question, and so on. For example, if the object is a phrase, the challenge may be a jumble of the letters of the phrase, and the contestant needs to unscramble the letters to identify the phrase. As another example, the challenge may be a trivia question, the answer to which would be the object to be found. As another example, the challenge may be a jigsaw puzzle, or divided image that is to be reconstructed to determine the hint. Other challenges and hints are possible. The answers to a challenges may be direct or indirect references to the hints, and so on.

In one embodiment in which the target is displayed as a ball shape, the target may be either automatically opened upon finding the target, or in some cases is opened by the contestant manually providing information (e.g., answers to questions, passwords, etc.), using, for example, the contest component 108. For example, where the target contains encrypted text, the encrypted text can be opened only by entering certain key words into the contest component 108. The hints (as described above) found on the web sites may guide the contestant to obtaining the key words. If the correct key words are provided to the contest component 108, the contest component will be able to unlock, decrypt, uncover or otherwise activate the ball and reveal information such as a secret, which can then be submitted for a reward. Alternatively, submitting the correct information may result in winning the reward.

In one embodiment, a contestant submits a request for a reward by providing evidence that they have found the target, or providing the result of decrypting encrypted text provided with or as part of the target, to the contest web site 110 or another web site. In one embodiment, the first contestant to provide correct data receives the reward. In another embodiment, some number of contestants who provide correct data receive the reward.

The reward can be any sort of reward that may have some value for the contestant. As non-limiting examples, this can include money, prizes, reward points, goods, services, points, invitations, event tickets and/or passes, downloadable content, gift cards, promotion codes, and so on. In one embodiment, the more time that passes in which the target is not located, or if located, not opened, the reward increases. The reward may also increase as more contestants join the contest. In some instances, the reward is based on the web site on which the target is currently located. For example, certain web sites may pay higher entry fees to participate in the contest, and/or the target may be located on a particular web site for longer or shorter time periods, and thus the reward associated with finding the target on a particular web site may be higher than others.

The web sites 120, 122, 124 may be any sort of web site that can provide content to contestants. Typically, the web sites will be web sites that have information regarding products or services, such that a contestant will learn about the product or service as the contestant is searching for the target. It should be understood that there may be any number, typically a large number, of web sites (exemplified for illustration as three web sites 120, 122, 124) in a particular contest. The web sites may be provided on any suitable server. One possible motivation for web sites to participate in the contest is the capability that the contest provides to drive traffic (i.e., contestants navigating the web) to the participating web site. In some embodiments, the desire to drive traffic to a particular web site at a particular date/time further motivates owners of the participating web sites to reserve or bid on specific dates and/or times that the target will be placed on their web site, using, in one embodiment, an auction format as described in additional detail below.

In one embodiment, the web sites are provided on one or more server-class computers capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). Web service software, such as provided by Apache Software, provided by the Apache Software Foundation, or INTERNET INFORMATION SERVICES from Microsoft Corporation may be used to provide web pages. The web sites 120, 122, 124 also could be implemented on any other suitable hardware or software.

In one embodiment, the web sites 120, 122, 124 provide to contestants information that is "hidden" in the web pages by enabling additional functionality that is not encoded in the source code of the web sites. The information that is hidden is received by the contest component 130 and provided to the contestant in many forms, one of which being an "overaly" web page that, when rendered in conjunction with the web sites 120, 122, 124 appears to be part of the web sites 120, 122, 124. A non-contestant viewer of the web page may not be aware that there is hidden content on the web page or additional functionality is available. In another example, the hidden information may be in the form of images, text, audio, or programming code, that only results in the presentation of the hidden information if the contest component 130 is present. In one embodiment, the hidden information includes a particular type of XML or HTML tags (e.g., "META" tags) that do not normally display to a user. In one embodiment, the hidden information is provided in the form of an anchor, which would be processed only if a plug-in is present. In one embodiment, the hidden information is encrypted, such that the contest component decrypts the information. In one embodiment, the hidden information is cryptographically signed, such that the origin of the hidden information can be verified.

In one embodiment, the hidden information is provided to web sites 120, 122, 124 by a back-office component 130. The back-office component 130 provides the data to the web sites, that the web sites can provide on their sites. The information provided by the back office component 130, for example, can provide text with hints for contestants, indicating where the target may be found. The information provided by the back office component 130, for example, can include the target itself. The information provided by the back office component 130, for example, can include encrypted target information that will need to be decrypted by the contestant using the contest component 130 or otherwise to gain a reward.

In one embodiment, the back-office component 130 provides information to multiple web sites 120, 122, 124. The information is for inclusion in the pages of the web sites 120, 122, 124 for a limited period of time. The information is for display of a target or information about the location of the target. Additional information is provided for display at the end of the limited period of time. In this way, the information provided in web pages to contestants can be updated regularly, and the contestants can be directed to different web sites.

In other embodiments, no information is provided to the participating web sites 120, 122, 124 and the back-office component 130 communicates directly with the contest component 108 residing on the contest device 102. This communication may be initiated by the back-office component 130, the contest component 108, or both. In such cases, the contest component 108 periodically (or in some instances continually) communicates with the back office component 130, which provides contest information to contestants, determines when a contestant is viewing a web site that includes the target, effectuates the display of the target, and implements the parameters of the contest.

Assignment of the keys and/or the target to one or more host sites may be accomplished in a number of ways. The sites may be chosen at random or selected by administrators, users or contestants. Web site owners or other authorized personnel may pay a fee to host the target. The fees may be determined prior to the announcement of the contest or determined based on the number of sponsors interested in hosting the target. Web site owners or other authorized personnel may bid for the opportunity to host the target in an auction style format. In each case, the hosting site may be subject to a verification and approval process. In general, to avoid conflicts, sponsors may not be allowed to participate in contests in which they have placed a successful bid to host the target.

Figure 2:
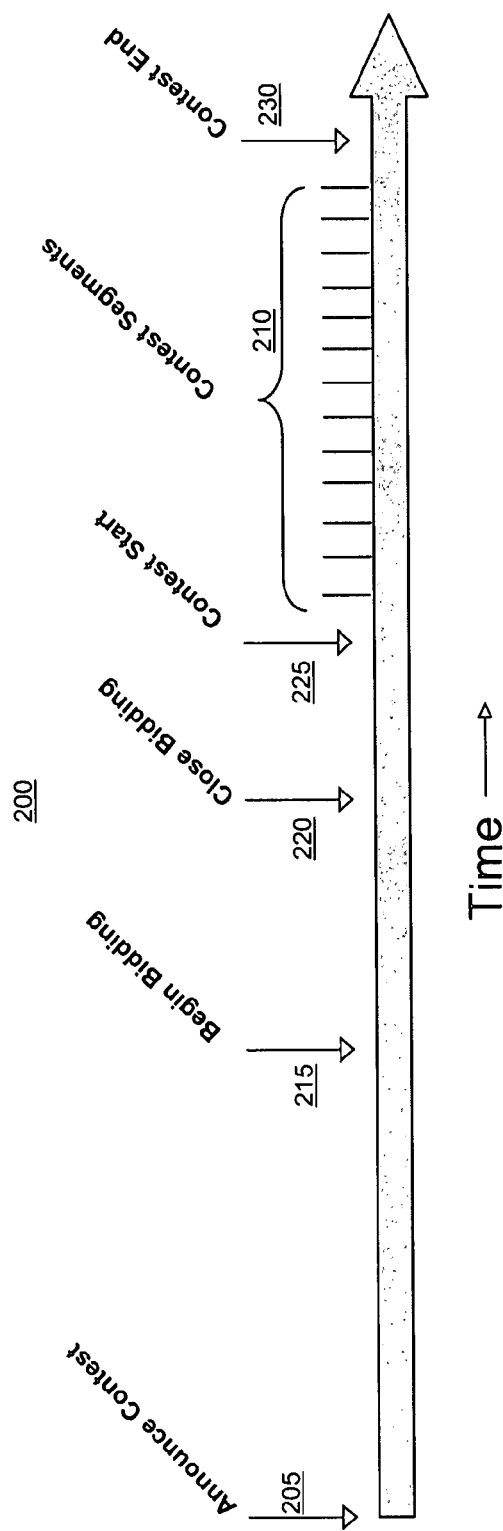
FIG. 2 is a timeline depicting various events during an online contest in accordance with an embodiment of the invention.

Referring to FIG. 2, in some embodiments, the contest can be sponsored by one or more participating web sites such that the sponsorship provides some or all of the prize for winning the contest. In general, the timeline 200 for a contest includes various phases during which a contest administrator, contest sponsors and contest participants interact via the network. For example, the contest administrator may announce a new contest (time 205) in order to encourage sponsorship and/or participation in the contest. The announcement may include one or more of various forms of advertising such displays on web sites, as email campaigns, print ads, radio and television commercials, online ads as well as viral marketing through web blogs and news aggregation web sites.

In general, entities host the site by paying value for the opportunity to do so, as the increased traffic to the sites provides value to the hosting entities. The opportunity may be reserved prior to the contest, during the contest, or both. In one embodiment, a portion of the payment (or payments) made be each host site for a given contest (or some portions thereof) is placed into a reward pool as a prize for the winner(s) of the contest. In this way, the longer a contest goes on, the higher the prize pool. The larger the prize pool, the more that contestants will be attracted to participate in the contest, thus making it more valuable for the web sites to host the target. In this way, the value of a contest may increase, for example, as the contest grows more popular and continues without a winner.

In instances in which the contest administrator solicits sponsors for the contest, an auction model may be used to encourage sponsors to bid for the opportunity to host some (or all) contest segments 210. In such cases, bidding can begin (time 215) at virtually any time before the contest starts. Bidding may even start after the contest starts in instances in which a contest is initially unsponsored, but due to high publicity and/or demand, the remainder of the contest is to be sponsored. For example, a contest may start with relatively few participants and a small prize such as $100. However, for example, through word of mouth and progressive prize increases (e.g., adding $100 to the prize for each day no one wins), the number of participants may grow to a number at which companies find sponsorship of the contest to be a valuable marketing strategy. In cases in which multiple contests are running in parallel, the announcements and bidding processes may occur during another contest in an attempt to encourage sponsors and participants to take part in other contests.

Sponsors may not necessarily bid for specific or fixed time segments. Instead, there may be a number of segments within a block of contiguous time, and sponsors may request one or more of these segments. Sponsors may bid for multiple segments within a single block of time or amongst several blocks of time. There may, in some instances be limits on how many time segments any one sponsor can win within a single block of time. In some implementations, a sponsor is only charged for payment after the target is actually placed on their site, so that if a contestant wins before a sponsor's web site is played, the sponsor is not required to pay. In some implementations, a new contest starts as soon as another completes and the sponsorship is applied to a succeeding contest.

At some point (time 220) bidding is closed. The close of bidding may be based on, for example, fulfillment of all contest segments 210, a predefined date and/or time, achieving a predefined monetary sponsorship level (e.g., a $10,000 contest) and/or one sponsor agreeing to sponsor the entire contest. In contests in which certain of these close bidding criteria are not met prior to the contest start (time 225), bidding may continue during the contest for future contest segments 225. Certain contest segments may be reserved (e.g., not available for bidding until the contest starts or the segment is closer in time) if, for example, those segments are deemed to be highly valuable or the value of the segments are likely to increase over time. For example, segments that overlap with a product announcement, a news event, or a sporting event (e.g., the end of the Super Bowl) may be held in reserve for bidding until it is known which contest segment will correspond to the event.

In one embodiment, the number of competing bid values associated with a segment will match the number of segments. For example, if there are 6 segments available within a specific block of time, potential sponsors see the 6 highest bids for those segments. In one implementation, the auction functionality implements a "maximum bid" feature so that potential sponsors can enter the maximum amount that they are willing to bid, and their bid will automatically increase as needed until the maximum amount is reached.

In one implementation there is a deterministic relationship between the bid close time (220) and the segment during which a web site hosts the target, such that there is a hosting site available when the target moves to a new hosting site. Sponsors may upload an image as part of the bidding process that can be used as the target when it is on their site, or in some cases the image may be used to create a puzzle, as described in greater detail below.

Once an auction is complete, the sponsor with the highest bid for a particular segment may be the winner to host the target for that segment. At the end of auction, the game administrator as well as the winning sponsor may be notified.

In some embodiments, in order to participate in the auction process, a potential contest host may be required to register an account with the contest administrator. In such instances, the sponsor's email address is confirmed, the potential sponsor accepts the terms of service, and may be asked to provide additional information, such as the following:

| Field | Description | Type | Required | Validation |
|---|---|---|---|---|
| Sponsor Id | Preferred Sponsor Id | Text | Yes | >4 < 10 |
| Password | Password for the account | Password Field (entries are *** out) | Yes | More than 5 and less than 25 |
| Password Confirmation | Confirm Password | Password Field type | Yes | Matches password field |
| Email Address | User's Contact Email | Text | Yes | Less than 256 |
| Email Address Confirmation | Confirm Email Address | Text | Yes | Matches Email Address Field |
| First Name | First name of Sponsor | Text | Yes | Less than 30 characters |
| Last Name | Last name of Sponsor | Text | Yes | Less than 50 characters |
| Street Address Line | Address of Sponsor | Text | Yes | Less than 128 characters |
| Street Address Line 2 | Address of Sponsor | Text | No | Less than 128 characters |
| City | City of the Sponsor | Text | Yes | Less than 128 characters |
| Zip Code/ Postal Code | Zip/Postal code of Sponsor | Text | No | Less than 10 characters |
| Telephone | Telephone Number of Sponsor | Numeric | Yes | Less than 30 |
| Fax | Fax Number of Sponsor | Numeric | No | Less than 30 |
| Payment | Preferred | Text | No | Less than 50 |

-continued

| Field | Description | Type | Required | Validation |
|---|---|---|---|---|
| Method preference | method of Payment | | | characters |
| URL* | URL of Sponsor | Text | Yes | Less than 256 |
| URL | URL of Sponsor | Text | No | Less than 256 |
| URL | URL of Sponsor | Text | No | Less than 256 |
| URL | URL of Sponsor | Text | No | Less than 256 |
| URL | URL of Sponsor | Text | No | Less than 256 |

To bid on hosting the ball, the sponsor visits the login page, and presents credentials, such as a username and password. The sponsor provides information about the requested bid, for example, in some embodiments, including the following information:

| Field | Description | Type | Required | Validation |
|---|---|---|---|---|
| Sponsor Id | Preferred Sponsor Id | Text | Yes | >4 < 10 |
| Game Color (Game identifier) | Color to be used to identify a specific game | Character | Yes | <128 characters |
| Auction Time Block ID | Identifier used to distinguish between blocks of time within one game | Character | Yes | <128 |
| Bid value | Amount of money that Sponsor bids | Currency | Yes | Currency |
| Domain | Sponsor picks from a list of their pre-approved URLS | Character | Yes | <512 |
| Image | Image from which puzzle is created | Graphic | Yes | Manual approval of image |

The game site will allow sponsors who have logged in to view auctions in process. There may be multiple bid opportunities within a game or amongst multiple ball games in process. In some embodiments, the following information may be provided:

| Field | Description | Type | Required | Validation |
|---|---|---|---|---|
| Game Color (Game identifier) | Color to be used to identify a specific game | Character | Yes | <128 characters |
| Game Status | Specifies Game status (in progress, completed, upcoming) | Character | Yes | <128 |
| Auction Time Block ID | Identifier used to distinguish between blocks of time within one game | Character | Yes | <128 |
| Length of Auction Time Block | Total length of time of this block | Numeric | Yes | Minutes - < |
| Auction Start | Starting time for the auctioning of this block of time | Date (time) | Yes | Date |
| Auction End | Ending time for auctioning this block of time | Date (time) | Yes | Date |
| Number of Segments | Number of Segments | Numeric | Yes | <25 |

-continued

| Field | Description | Type | Required | Validation |
|---|---|---|---|---|
| Jackpot | Available for this Block of Time Maximum possible payout based on # of winning bids for the game thus far | Currency | No | Currency format |
| Competing Bid Values* | The other bids for segments within this Block of Time | Currency | Yes | Currency format |

There may be one or more criteria for ending a contest (time 230). For example, the contest may end at a predefined date and time (e.g., midnight on February 1), at which time the participant (or team of participants) having performed the best (e.g., visited the most sites, found the most target objects, completed the most puzzles, etc.) is declared the winner. In other cases, the contest may continue until a participant meets a contest objective. In some embodiments, if no participant meets the contest objective by a particular time, the prize may be "rolled over" into a new contest.

Figure 3:
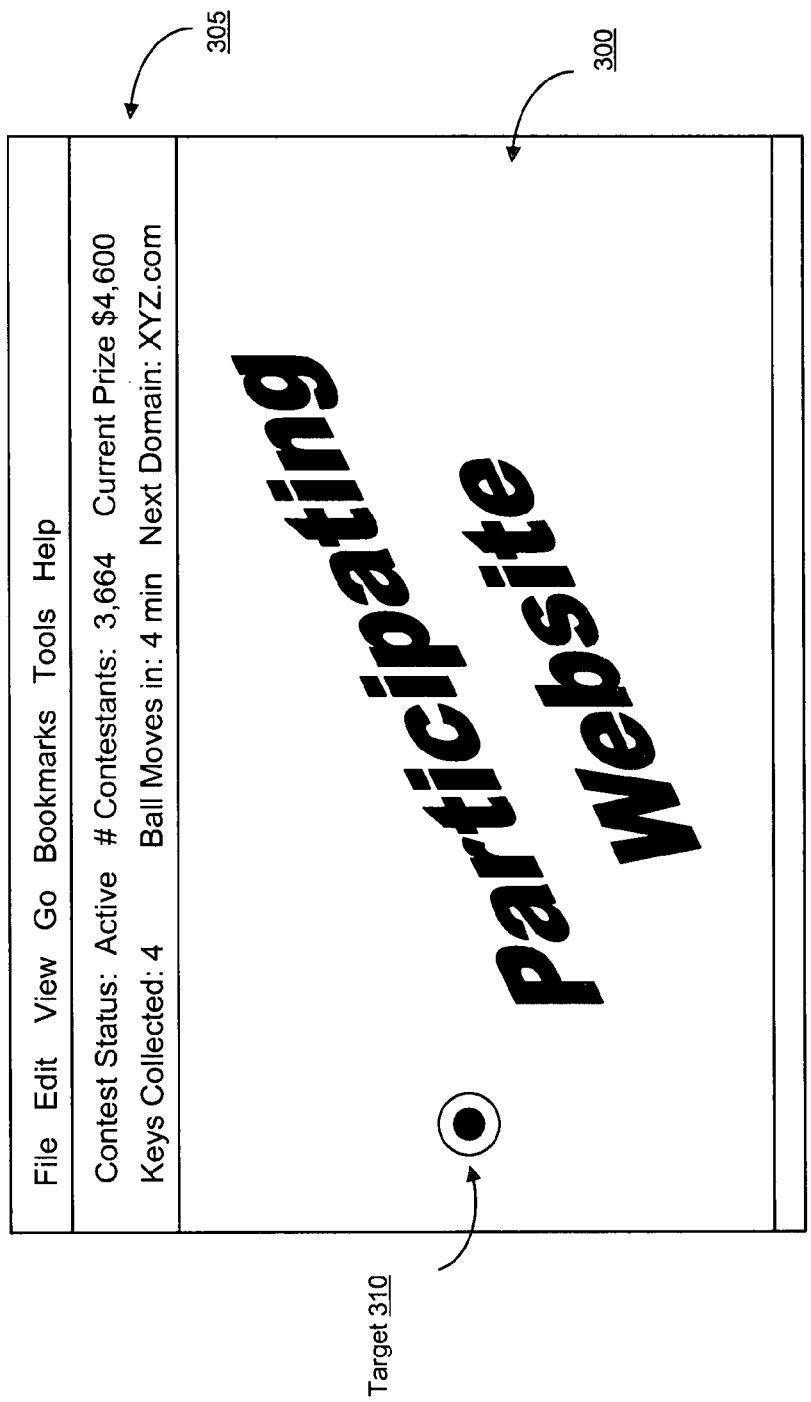
FIG. 3 is an example web site display according to an exemplary embodiment of the invention.

Referring to FIG. 3, a participating web site 300 is rendered on a contestants device along with the contest component 130 which may include information about the status of a current contest, multiple contests, and/or upcoming contests. For example, in an exemplary embodiment, a contestant visits a contest web page that may include contest rules, registration pages, and instructions for downloading and installing the contest component 108. As one non-limiting example, the contest component 108 may be implemented as a "toolbar" 305 within an application operating on the contest device (e.g., a web browser). In other instances, the contest component 108 may be implemented as an information screen within a separate application using, for example, asynchronous JavaScript and XML ("AJAX") such that much of the user-initiated actions are processed on the contest device. In such cases, contest data may be exchanged with the back office component and/or contest server behind the scenes and any web pages being viewed by the contestants do not have to be reloaded each time a change is made, thus increasing the interactivity, speed, and usability of the web page.

Examples of information that may be displayed to the contestants via the contest component 305 includes whether the contenst component is enabled, the status of one or more contests (e.g., active, not active, six active contests, etc.), the number of contestants currently participating in one or more of the contests, the current award for finding a target object, the number of keys and/or hints the contestant has collected from previously visited sites, the current status of the target, a time limit that the target will remain in its current location, hints as to the current or future location(s) of the target, and/or the next location (e.g., URL, domain, or page location) of the target. In some embodiments, the hints are automatically generated based on contents of the participating web pages (e.g., randomly and/or deliberately selected text, graphics, objects, or combinations thereof). In some embodiments, the hints are predetermined by the participating web site, to, for example, assure that vistor traffic is directed to a particular page, advertisement, or other component of the web site.

The contest component 305 has the ability to retrieve a list of available active games (e.g. games in progress for which the contestant is eligible to participate) and the associated contestant status (registered/unregistered) for each game. By default, the top ten games (by current prize value) may be shown, and additional games may be accessed using, for example, a drop-down list or link. The status of each contest is updated by a request to the contest server for the list of currently active games and associated contestant status.

The contest component may also include a "leader board" that indicates the status of one or more contestants in the game. The leader board may be available both in the contest component as well on the game website and may be sorted by game (e.g., drop-down box to allow contestants to view the status of various games). A contestant's ranking may be determined based on, for example, the number of keys retrieved in the current contest, their final standings in previous contests, or some combination thereof.

In one implementation, contestants can view a list of sites where target objects may be located in the near future or at certain times, such as the contest segments auctioned off to contest sponsors during the auction process.

A "Show Domains Found" function allows contestants to view the web sites from a particular contest that have been discovered by contestants participating the game. In some embodiments, when a contestant finds a key, the list of discovered web sites may be updated to reflect the current web site for which a key was just found, if the web site is not already on the list. This may encourage a "chase/swarm" behavior where contestants who are lagging in the contest can catch up by navigating to the web sites discovered by the contest leaders and obtaining keys from those sites. In some cases, the contestants may be able to skip certain sites, for example, if those sites do not have keys that are required to unlock the target object. For example, if a lagging contestant notes that there are ten web sites between himself and the target object, he may choose to skip over some intervening sites, if only keys from the five sites immediately preceding the target's location are required. In some implementations, this "skipping" of sites is not possible, for example, in the case of a site hosting multiple times within one contest.

Once a contestant installs the contest component, she continues to navigate to various web pages, either based on hints about the location of the target, at random, based on information provided by the contest component or by others, and so on. As contest status changes, information may be sent to the contest component on the contestant's device and information about the current page being viewed by the contest device may be transmitted to the back office component. In one embodiment, the location of the target is stored on the back office component as an encrypted numerical representation of the URL using, for example, a hash function. As the contestant views a particular web page, the URL is communicated to the back office component via the contest component, where the same encryption and/or manipulation function can be applied. The back office component may then compare the "hashed" URL of the current target location with the "hashed" URL of the web page the contenstant is viewing. If the two match, the back office component may then cause a visual representation of the target 310 to appear on the web page. Using this technique, operators of a participating web sites do not need to make changes to their web sites to participate in the contest.

Similarly, if the target is hidden at a particular location on a web page (e.g, at a visible or hidden icon, word, phrase, media file, object or image) or a hidden page within a web site, the contest component may use a combination of the URL and the filename and/or object name or other identifier as input to the hash function. In this way, the domain name and/or the URL in which the target is located can be made public, thus generating excitement about the contest and the participating web site, while allowing the back office component and contest component to securely and secretly place the target within the participating web site. In one embodiment, the target location is provided to the contest component when it communicates the URL to the back office component. In another embodiment, multiple targets (possibly located at different domains) may be used, and contestants are instructed to find and/or unlock all (or some number of) the targets to claim the reward. In such cases, the contest component may include a counter indicating to the contestant the number of targets that have been found and the remaining number to complete the contest. Such an implementation further reduces cheating, as the liklihood that a single individual would know the particular location of more than one or two of the targets is remote.

Referring to FIG. 4, in another embodiment, the HTML source of an exemplary web page includes two inserts that may be used to identify where and/or when the target and/or a hint is included in the web page. The first insert 410 is an anchor link. The link includes an identification string. This identification string can be used by the contest component, for example, to display a graphic image or other content included in the identified file. This anchor may require a user to find and click on the location of the tag in order to go to that hidden location. In this way the user searches for a target. Alternatively, the contest component may recognize the tag, and parse the string of data that is included in the tag. In this way, the browser may ignore the tag, while the contest component provides a display or takes other action based on the characters in the string.

The second insert 420 is a special tag that typically is not displayed. This tag, in this example, a META tag, is used as an example of how a hint can be provided to a contestant. The name of the META tag 320 in this demonstrative example, "bb-hint" indicates that it is a hint for use in the contest. The content of the tag 320, "YOU'RE GETTING CLOSER" would be useful to a contestant to indicate how close they are. The hint might say instead, such text as "THE TARGET IS NO LONGER ON THIS SITE," or "TRY LOOKING ON A SITE FOR FLIGHT," or any other information that would be directly or indirectly useful for a contestant in locating a target. Although shown in clear text, it should be understood that the information in the tab may be encrypted or otherwise obfuscated.

In one embodiment, the information in the META tag may be identified by a contest component and displayed to the user as part of the web page. In another embodiment, the META tag is identified by the contest component and displayed in a separate window or display. It also should be understood that a META tag may be used in this manner to facilitate display of a target.

Referring to FIG. 5, in an exemplary display that is generated from the HTML code of FIG. 4, the hidden information described with reference to FIG. 4 is displayed to the user. As shown in the figure, there may be an empty space 510 where the hidden anchor is provided. In one embodiment, the user may be required to find and click on the location of the tag 510 in order to go to the web page referenced in the tag 410 of FIG. 4. In another embodiment, the user simply may not see the information provided. In another embodiment, the reference in the tag 410 of FIG. 4 may cause the contest component and/or the browser to display content only in some circumstances.

As shown in the figure, in this example, the contest component 130 has recognized the META tag 420 of FIG. 4, and displays the text as a hint to the contestant. Thus, the web page is presented to the contestant with the additional information. Here, the text of "YOU'RE GETTING CLOSER" tells the contestant that he or she is close to the target. It should be understood that more or less specific information may be provided.

Referring to FIG. 6, in another exemplary display, another demonstrative web page is shown, generated from the HTML code of FIG. 4. In this example, however, the anchor tag 420 of FIG. 4 has generated an image of target 310. This striped ball may be an image that in one exemplary embodiment represents the target, and in another exemplary embodiment represents an encrypted value that can be decrypted to obtain the target. By clicking on the striped ball, for example, the contestant can go to the page is linked, or the contestant can download the target for further processing, and so on. Depending on the configuration of the contest component, the contest component may interpret or provide other processing for access to the target. As shown in the figure, the META tag 420 also may be interpreted as described with reference to FIG. 5. It should be understood that in some embodiments, it would be possible for the hint to include a different message if the target is located on the same page. There may be any number of such tags on any number of pages within a web site, including decoy tags meant to distract contestants or prevent the contestant from locating the target by viewing the source code of the page.

In other embodiments, participating web sites are not required to add any tags, files, code, or objects to their web pages to participate. For, example, the contest administrator (using, for example, back office component and/or contest web site) may provide the contest component to contestants via a web site, FTP site, or delivered via email. The contest component provides the additional information on the page without the need for any special information on the participating web sites. Such an arrangement frees the participating web sites from having to alter their web sites with specific code, tags, or images and allows the operators of such sites to participate in the contest and still maintain any site-specific release schedules or procedures.

Figure 7:
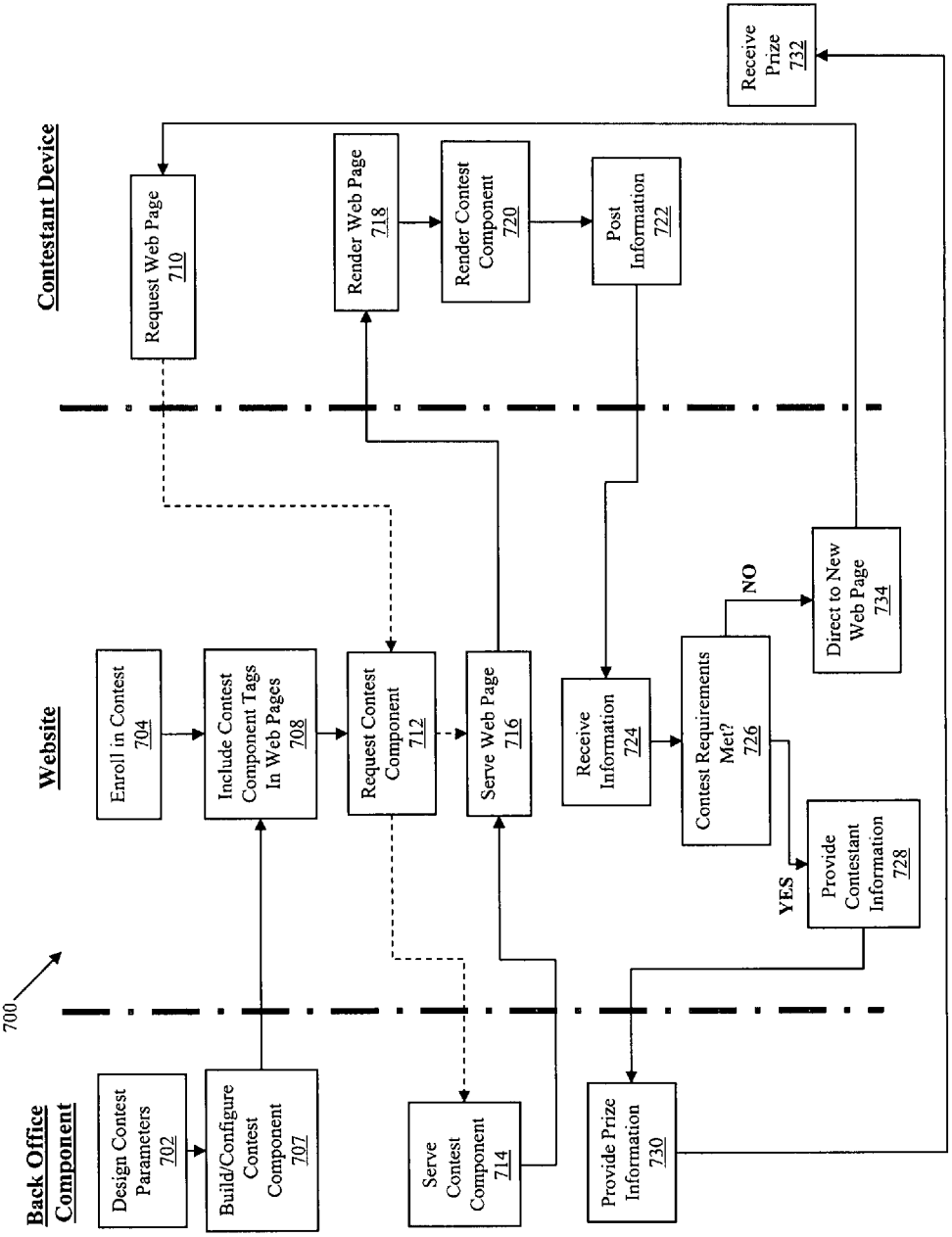
FIG. 7 is a flow chart of a process for implementing a contest according to an embodiment of the invention.

Referring to FIG. 7, a process 700 illustrates the interaction among the back office component 130, web site 120, and contestant device 102 (which in some cases may include the contest component 108) in accordance with one embodiment of the invention. Initially, and possibly continuing through the process 700, the design contest parameters describe the rules and constraints for the contest (STEP 702). Examples of design parameters that may be used to define the contest include date/time parameters such as a start date/time, end date/time, and/or duration, prize type (money, discounts, goods, services, trips, etc.), prize characteristics (progressive, constant), contest hints, hint locations (within a web site, media file, and/or on a web page), visual characteristics of the hints, and/or the web sites/domains in which the hints are placed. In one example, where the contest requires contestants to find a hidden ball on numerous web pages, the ball is visible for only a short period of time on any one particular page, and may provide (or leave behind) hints as to its next location. The ball may, for example, remain visible and/or possible to be found for a consistent amount of time on each page, whereas in some cases it may move about a page (or from site to site) at some variable rate (based, for example, on a random number, the amount a particular web site owner paid to participate in the contest, or how many contestants have looked for the ball on a web site or how many have found the ball).

In some embodiments, the contest parameters are set at the beginning of a contest, and in some cases the parameters are modified during the contest, to encourage participation, for example. As some non-limiting examples, contests that occur over longer periods of time may provide escalating prizes over time, or shorten the amount of time a hint or contest component is available at a particular site as the number of contestants participating the contest grows, thus making it harder to win. In some cases, segments of the contest are allocated to a web site during a contest, and/or prior to the beginning of the contest, such the web site owners can gauge the success of the contest, and pay for continuing participation accordingly.

The parameters are communicated to one or more web site operators/owners who, if interested, enroll in the contest (STEP 704) as a hosting web site. A web site owner may, for example, be planning a new product launch, promotion, or site redesign and/or otherwise desire to drive additional traffic to its site. In some embodiments, different web site owners may participate in the contest if, for example, the contest has a large prize, is being run during a period of known high web traffic (e.g., during an election, during a "vote-at-home" television reality series, or just prior to the Super Bowl), or if the users being targeted by the contest are known to have particular demographic characteristics. In some cases, different segments of a contest may be priced differently, or be bid on separately, allowing more desirable time segments to generate higher participation fees than others. For example, where the contest requires web contestants to navigate to numerous web sites to gather hints to answer a series of questions, the site hosting the last hints may pay more for participation than sites hosting earlier, anticipating, for example, that there will be more contestant interest and participation at the end.

In some embodiments, web site owners bid on the opportunity to host the contest. For example, where a contest is scheduled to last 24 hours, various segments of the contest (e.g., quarter, half or full hour increments) may be "won" by a highest bidder. Bidding on contest segments may occur in advance of and/or during the contest, and may be done openly or anonymously. Participating web sites may be provided information about the contest (e.g., the number of current contestants, the current prize, etc.), information about previous contests such as traffic data aggregate and user profiles and demographics, as well as other information used to entice web page operators to bid. In some embodiments, some or all of the revenue received from successful bids is included in the reward.

In some embodiments, participating web site administrators specify payment amounts as a specific dollar amount for a particular interval (e.g., $50,000 for ¼ hour, or $20,000 for 10,000 contestants). In another embodiment, web site administrators specify the amount that they will pay for each contestant that comes to the web site (e.g., $0.02/contestant that visits the site), and/or for each contestant that views a particular page on the web site (e.g., $0.02/view of page X, Y, or Z).

In some embodiments, one or more parameters are embodied in one or more software components or objects that, when combined, constitute a complete contest. The components may be specified (STEP 706) by a contest administrator.

Once the contest parameters are determined and any necessary components provided, the web site owners are provided instructions about how to include the web site in the contest. For example, the web site administrator may be instructed to build connections to the back-office server, or include contest component tags on one or more web pages within their web site (STEP 708). For example, the contest administrator may provide an address and/or formatting instructions (e.g., page placement, color, size, etc.) to be included in such tags, filenames, or software objects that are included with the web page content when rendered. The tags may also include text to be displayed with the contest component, an image file, multimedia element, or any other element (or characteristics of the elements) that can be rendered on the contestant device using conventional web browsers, the contest component, or both.

In some embodiments where no changes are to be made to participating web sites, the web site operators may provide a copy of the web site (or the specific pages within the site that are considered candidates for the location of the target) to a contest administrator via the contest web site and/or back office component. The contest administrator may use the copy of the web site to create numerical representations of the site, the pages, and the elements within the page, (using, for example, a hash function) and store the representations for subsequent reference during the contest to determine that a contestant has visited the web site, and/or to identify target locations and/or hints.

A contestant, informed about the contest (e.g., via word of mouth, web logs ("blogs"), email, advertisements, or otherwise) uses the contestant device (computer, cell phone, PDA, etc.) to request a web page (STEP 710) by issuing an HTTP/HTTPS request to one of the participating web sites. The user may, for example, type the URL of the participating web site into a browser navigation text box, select the URL from a list of search results, or select the URL as a link from another web page, an email, or other document that includes active web links. The HTTP/HTTPS request is transmitted to the appropriate web site, where the requested page is compiled by gathering any text, media, and images that constitute the site. In some embodiments, the contestant has or requests one or more contest components (STEP 712) from the contest administrator by sending an HTTP/HTTPS request to back-office component server by including one or more tags directed to the back-office component in the requested web page. In other embodiments, the contest component may be provided directly by a contest administrator (via a contest web server, and/or back-office component for example) in real time, i.e., in response to the contestant's request for a web page (STEP 714). In some cases, however, the contest components may be provided to the web site owners in advance, giving the web site(s) greater control over the format, placement, functionality, and/or distribution of the contest component. Once the various components of the web page are compiled, the page is served to the contestant (STEP 716).

Upon receipt, the contestant device renders the web page (STEP 718). In some embodiments, the web page may be fully rendered using a web browser, thus requiring no additional software. However, in some cases, the contestant is required to have downloaded, installed and/or included the contest component on their device. For example, where the contest is directed to finding a hidden object on web pages, the contest component may be a "decoder ring" object (expressed in software, such as an AJAX applet) that when used to render and/or view a particular web page allows otherwise invisible, obscured or encrypted objects to appear or generates such objects based on other contest information (STEP 720). The component may be provided by the web site participating in the contest (as, for example, a downloadable component or an email sent to contestants prior to or during the contest) or in some cases may be provided by the contest administrator using similar means. In some cases, such as cellular telephones, the component may be pre-loaded on the phone such that the purchaser of the phone does not need to download or install the component. In such cases, the contestant may then purchase the "contest" option from the service provider, or activate the component by calling a predetermined telephone number, sending a text message, an email, or registering a unique identifier at a web site.

Upon finding a hidden object, the contestant may then be provided with information relating to the prize they won (or may win if they continue to play), a hint as to the next location of the object, a puzzle, a problem, and/or a series of questions. In some embodiments, solving a puzzle and/or answering questions correctly "unpacks" the target object such that the contestant can see the next hint, target location (e.g., a URL), or prize. The questions can be used to specifically identify the contestant (e.g., a name, nickname, handle, screen name, telephone number, or email address) or be anonymous in nature. In some embodiments, the questions may be related to previously visited web sites participating in the contest to determine if the contestant visited the sponsor pages and remembered information presented on the page. The questions can also be of a more general nature, such as questions about current or historical events or other trivia. In some cases, the questions can be focused on personal traits and preferences of the contestants such that the compilation of such data can be used in subsequent marketing research. Once the contestant has completed any data entry requested by the web page, the data is posted back to the web site (STEP 722) for processing, storage, authentication, and/or analysis.

The web site receives the information provided by the contestant (STEP 734), and in some embodiments authenticates the information. The authentication process can use, for example, a user id/password combination, IP address, MAC address, URL, public/private key pair, or other signature and/or encryption/decryption techniques to assure that the information is authentic. Once authenticated, the web site processes the information to determine if the contest requirements have been met (DECISION STEP 726). For example, where the contest requires that a user provide information about a series of web pages they visited (e.g., by following an object or hint(s)) the information provided by the contestant is compared with an answer key to determine if the information is correct. Similarly, in cases where the user is required to provide a valid email address, the address can be checked by sending confirmatory email to that address and awaiting a delivery confirmation. In some embodiments, the information can be transmitted to the back office component for any or all of the authentication and/or confirmation steps described above.

If the contest requirements are met, the web page provides contestant information (STEP 728) to the contest administrator such that the administrator can provide the prize information to the contestant (STEP 730). The prize can be sent via email or in some cases the an email can be used to direct the contestant to a secure site from which they can download the prize. In cases where the prize is a cash reward, the contestant may be instructed to register for service such as PAYPAL (www.paypal.com) that facilitates electronic transfer of funds among individuals and companies. In other situations where the prize is merchandise that cannot be delivered electronically, the contestant can provide a mailing address to which the prize is shipped. In some embodiments, the web site retains certain contestant information as part of a customer marketing database for future promotions and analysis.

If, however, the contest requirements are not met (either the information was incorrect, there are additional steps to perform, or both, for example) the web site can direct the user to a new web page (STEP 734) where she can continue to participate. Once directed to a new web page, the process can be repeated any number of times until the contest ends. In some cases, the new web site will be under the control of the web site (i.e., another web page within the same domain), whereas in other cases the new web page may be that of an affiliate or partner. In some embodiments, the new web page is specified as a parameter of the contest, and the contest administrator determines which new web page the contestant is directed to based, for example, on an auction. As an example, if a contestant provides information indicating that they have a high household income, and/or have answered one or more other questions such that the answers match a particular rule (e.g., "I plan to purchase a new television in the next three months") a consumer electronics company may have more interest in having contestants visit their web site than an online dating service would. In such cases, the consumer electronics company may desire to have such contestants directed to their web site, and the contest administrator can define the parameters of the contest accordingly.

As one demonstrative example, a contest may be thematically directed towards women with an interest in long-distance running. The web sites hosting the contest may include sites with content directed to women (e.g., women's health publications, women's clothing brands), sites directed towards athletics and/or running (e.g., athletic publications, athletic footwear, sports drinks), sites directed to an upcoming women's road race (e.g., the registration site for an upcoming 10 k race), as well as sites of general interest (e.g., a travel site). The puzzles also may reflect the theme, for example, by including trivia questions about running and health, pictures of marathon winners, and/or race routes to be unscrambled or described. The targets also may reflect the theme, for example, choosing target words like "marathon," "long-distance," and so on, as well as pictures that would be of interest. Likewise, an assessment may be made about the difficulty of the puzzles enjoyed by the group of people with this interest, and the puzzles developed accordingly. Such a contest may itself, for example, be sponsored by a running organization that would like to attract women runners to its membership base, or by a brand of running shoe. In some cases, simply designating a contest to have a particular theme will attract relevant sponsors to bid to participate. In other cases, sponsors may be designated or directed to categories of contests to participate in based on web site content or other information. In some cases, prizes for participation or winning may include coupons for, or actual running-related gear, food/beverages, and so on.

As another demonstrative example, a contest may be thematically directed to people with an interest in history. Sponsors and sponsoring web sites may include, for example, sites promoting historical sites or travel, sellers of historic books, and galleries of historic artwork. The puzzles may be developed such that people with an interest and knowledge of history would find them to be interesting and challenging. For example, a puzzle may include history trivia questions, or require a participant to configure or unscramble a map with countries as they existed at a particular time in history. The target words and pictures might include historical figures, and an assessment may be made about the difficulty of the puzzles enjoyed by the group of people with this interest, and the puzzles developed accordingly.

In some embodiments, a general or themed contest may have puzzles that have a particular level of difficulty (e.g., particularly difficult or easy) and/or have only puzzles of a certain type. For example, a contest may only have puzzles that are math puzzles, and that require significant knowledge and mathematical skills. For example, a contest may have only very difficult Suduko-type math puzzles. As another example, a contest may have only medium-level pop-culture trivia from the 1970's.

In some embodiments, contestants have the opportunity to provide information about demographics and/or interests, for example on the contest site as part of registration or later as part of completing a profile. This information may be used to direct the contestant to particular contests that may be of interest. It also may be possible to monitor the success of a contestant at completing certain puzzles in contests of general interest, and from an analysis of the difficulty and topics of the puzzles at which the contestant has succeeded, suggest or direct the contestants to contests that would be at the correct level or interest of the contestant.

For example, if a contestant proved particularly able at math-related puzzles, but not as able in history trivia, the contestant may be directed to a contest with easy history trivia puzzles or more difficult math-related puzzles. As another example, a contestant with particular interest and ability at trivia would be directed to a contest with puzzles that would be sufficiently challenging.

In some embodiments, prizes may be offered not only to contestants who have won, but also to contestants who participate in the contests. For example, while the prize for recovering the contents of a target (e.g., the ball) may be $1,000, a reward for finding 5 keys and completing 5 puzzles may be a coupon to purchase a sports drink, points that can be accumulated for prizes, and so forth.

In some embodiments, tournaments may be held, to identify the best contestants in a particular theme, or with ability to solve particular puzzles. For example, a first level contests may be held with puzzles of a relatively easy level, with winners of those contests then eligible to compete in contests of greater difficultly. Winners of those contests then may participate in contests of even greater difficulty. In this way, the best contestants of a particular type or theme may be identified and rewarded. The contests may be organized in a tournament bracket, or otherwise.

Figure 8:
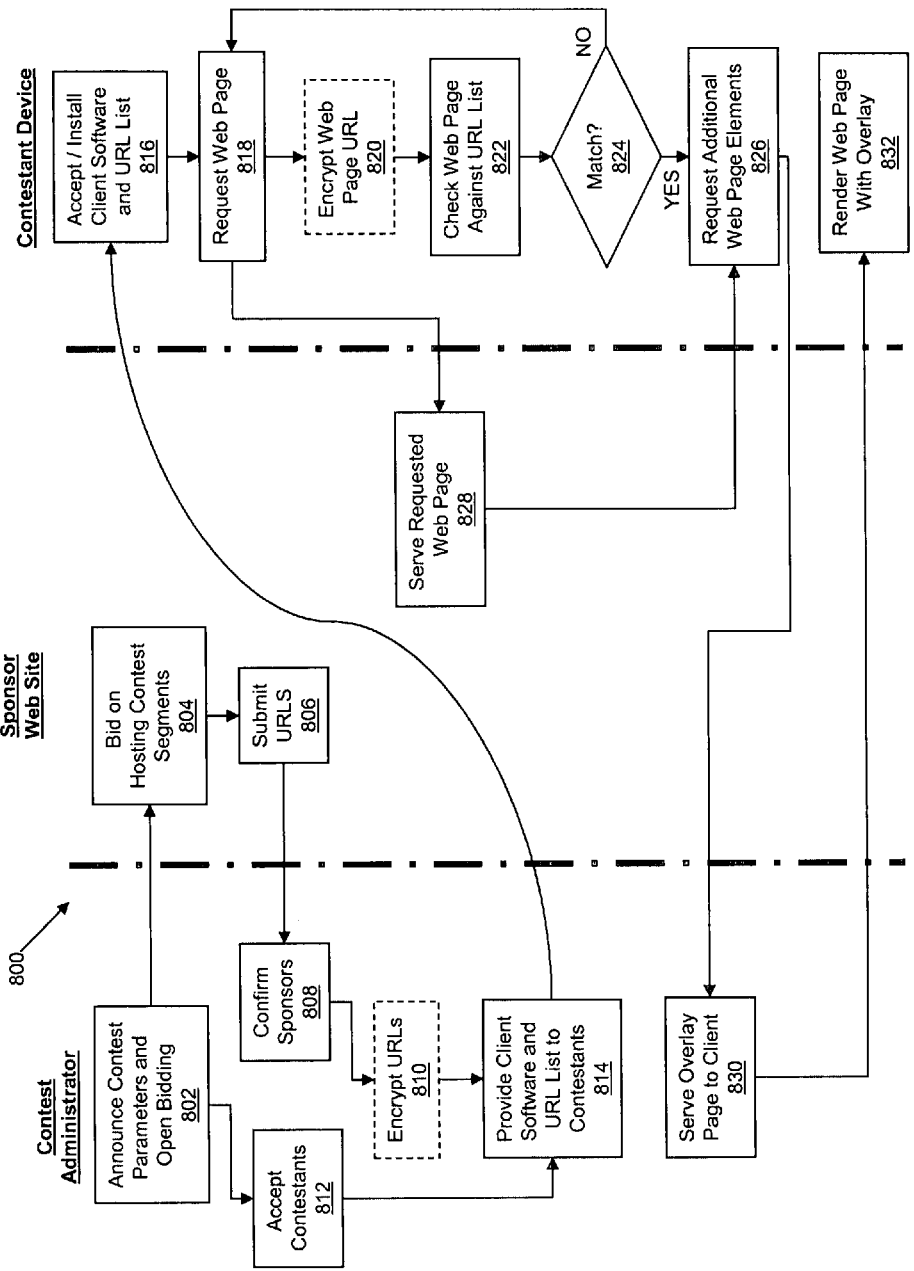
FIG. 8 is a flow chart of another process for implementing a contest according to an embodiment of the invention.

Referring to FIG. 8, an alternative process 800 for implementing the online contest is illustrated. The process 800 starts with an announcement of a new contest (STEP 802) by a contest administrator. The announcement may be promoted through various forms of media such as television, email, viral marketing, radio, print ads, and the like, and be targeted at potential sponsors, potential contestants or both. In implementations in which the contest is sponsored, entities that desire to sponsor the contest (or segments thereof) can respond to the announcement by bidding on the opportunity to host contest segments (STEP 804). For example, an online auction may be held in which the contest segments are identified by date and time (e.g., January 5$^{th}$ from noon to 1:00 pm) and/or order (e.g., the fifth of ten contest segments). Potential sponsors can bid on one segment, or in some cases multiple segments. There may be minimum bids for certain segments (e.g., those that represent potentially valuable time segments or are close to the end of the contest). Potential sponsors may be limited to a maximum number of bids or segments, whereas in some instances there may be no limits. If a potential sponsor wishes to host an entire contest, they may place a bid on sponsoring the entire contest. In some implementations, contests can be specifically designed for one sponsor, and can, for example, include target objects such as trademarks, products, or images that are owned by or affiliated with the sponsor.

Once a sponsor has selected a contest segment or won the opportunity to host a contest segment, the sponsor submits one or more URLs (STEP 806) to the contest administrator. The contest administrator confirms the validity of sponsor(s) and the associated web sites (STEP 808) to assure that the URLs are appropriate for the contest. For example, the contest administrator may wish to determine that the web sites associated with the URLs can service the increased traffic associated with the contest and that there are no broken or outdated links on the site. Further, the administrator may wish to ensure that the content on the sites is appropriate for the contest (e.g., no pornography, violent content hate speech, or illegal content). The game administrator may determine that the site meets certain technical requirements, such as being "deep" enough (i.e. to increase security, a hosting URL must contain enough sub-pages to effectively "hide" the target within those sub-pages). The contest administrator may also, in some cases, approve sponsors (as being appropriately authorized) before they are able to bid to host the target for a particular domain.

In preparation for providing the URLs to the client software (i.e., the contest component) on the contest device, the URLs may optionally be encrypted (STEP 810) in order to deter potential cheaters that may attempt to uncover the participating URLs by reverse engineering or otherwise examining the contest component, for example.

As the administrator gathers sponsors for the contest, contestants may also register for the contest (STEP 812). Contestants can register by, for example, providing a user name, email address, password, account number, or other personally identifiable identifier. Potential contestants may be required to sign-up on a publicly available web site before downloading the contest component plug-in software. In some instances, contestants must agree to a Terms of Service to participate in the contest. Registration may facilitate future contestant logins from multiple machines such that contestants can participate using a computer, cell phone, PDA and other similar devices. The registration information may be validated to determine whether an account already exists for the email address, and in some cases a confirmation message may be sent to the contestant's email address with a code or link used to complete registration, so as to confirm the email address.

Contestants may to register for games individually, for example using a web browser, or through an application process, and contestants may be provided with a starting clue once they have any necessary software and have registered for a specific game. Thus, contestants may be able to log in and participate in one or more game instances, receive notifications and clues to lead them to the target objects, and ultimately to claim a prize. Contestants may be able to log in to their account in both the contest component as well as the game website, for example, using the User ID and Password. Login facilitates play on different machines, without having to re-register information, although users will have to download the contest component for each new machine. The contest component may also display information about past and future contests and participating sites as well as the contestants' relative standing in specific contests.

In some embodiments contestants may be asked for additional demographic information (e.g., sex, age, state of residence, education, interests, income, etc.) and such information may be provided (either individually or in the aggregate) as marketing data to one or more sponsors of the contests. Once the URL list is complete for a contest (or in some cases when a certain number of initial URLs are available) and contestants have registered, the contest administrator provides the contest component software and the URLs to the contestants (STEP 814).

Once registered, contestants accept and install the contest component and list of participating URLs on their client device (STEP 816). The contest component can be implemented, for example, as one or more browser extensions using the target browsers' extension mechanisms such as XUL/XPI for Firefox and COM for Internet Explorer. By providing the URLs to the contestants, the participating sponsors do not need to modify the code of their web sites that will be hosting the contest; instead, information about the location and identity of target objects is maintained at the central contest server and provided to contest component on an as-needed basis.

Once the contest starts, the contestants request various web pages (STEP 818) by selecting links from web sites, emails, instant messages or entering URLs into an address text box of a web browser application. Upon rendering the URL, the contest component determines whether the site is participating in the contest by, for example, confirming with the contest server that the site contains a key or the target object or by checking a locally-stored list. If the site is participating, the contest component checks to see whether the user is a registered contestant. If the user is not registered, she may be informed that the site contains a key or the target object for a contest, and presented with a registration form.

In some embodiments in which the URLs are encrypted, the URL of the current web page rendered by the browser application is also encrypted (STEP 820) using similar techniques as were applied to the participating URLs. The encrypted URL of the current web site can be compared to the list of encrypted URLs generated by the contest administrator or the back office component (STEP 822) to determine if the browser is currently presenting a web page attributed to a participating sponsor (STEP 824).

In some embodiments, a check may be performed to verify the integrity of the next site and/or the site following sites. Preferably, a check is done as close as possible to the actual time period that a particular web site is scheduled to host the target (e.g., when the target moves to the web site immediately preceding the particular site) to minimize the occurrence of any changes in the site between the time it is checked and time it hosts the target. The check may be to confirm site availability (e.g., a check for a "404 error") and for content, both for acceptability and to determine that the site has not changed in a manner that would change the selection or presentation of the target objects. If a site is not available or has changed such that the administrator determines the site should no longer participate in the contest, the contest administrator can direct the target object to the next scheduled domain, web site, or different sub-page on the current domain, thereby skipping or delaying the site that was selected.

In an implementation in which the contest component is a plug-in, the contest component may test whether a site is a relevant site by performing a hash operation on the web site name (e.g., the URL, IP address, or some combination), and check for the hashed value as users visit web sites. If the hash of the site is found in the list of hashes (meaning that it is likely to be a site that does, did and/or will contain either a key or the target object), then a query may be sent to the server to determine whether the site contains a key or target. (In some instances, contestants are not notified as to whether it is a key or the target, only that it is an important site to the game. In some implementations, a Bloom filter is used to quickly identify the hashed values.

The term Bloom filter is used to refer to a form of hash table, described in Burton Bloom, "Space/time trade-offs in hash coding with allowable errors," in Communications of the ACM, Vol. 13, Issue 7 (July 1970), in which a small number of errors may be tolerated. Thus, a Bloom filter is a probabilistic data structure that can be used to test for set membership in constant space and constant time. It may return false positives, but not false negatives.

It is possible to create a Bloom filter either by specifying a capacity (maximum number of items to be inserted) and a maximum error rate, or by specifying a size for the bit vector and a number of hashing functions. When a Bloom filter is created by specifying a capacity and an error rate, the size of the bit vector and the number of hashing functions may be computed to minimize the size of the bit vector while preserving the maximum error rate at the given capacity. More items than the capacity may be inserted, but beyond the capacity the guaranteed error rate no longer holds.

A Bloom filter may use a family of hashing functions, such that when the algorithm requires k distinct hashing functions for some positive integer k, those functions can be generated. Using one algorithm and salting it or seeding it with k different integers to generate k different hash functions is an appropriate technique.

Typically, it is possible to insert an item into a Bloom filter, and check whether an item is contained in a Bloom filter. It also typically is possible to compute the intersection of two identically initialized Bloom filters (same bit vector size and number of hash functions). Note that this is simply the bitwise AND of the two bit vectors. It also is be possible to compute the union of two identically initialized Bloom filters (same bit vector size and number of hash functions). Note that this is simply the bitwise OR of the two bit vectors. It also is possible to convert a Bloom filter to and from a string representation that would be suitable for use in a plain text or HTML document.

For example, a Bloom filter could be used to make a large, complex web site searchable. For each page, a Bloom filter is created and every word on that page is inserted into it. To search the web site for a keyword, that word is checked for membership in the Bloom filter for each page, and the matching pages are returned. Since the Bloom filter is probabilistic, some false positives will be returned, but no matching pages will ever be missed.

While the use of a Bloom filter may be preferable, it should be understood that other forms of hashes and hash tables, encryption, and so on may be used to allow the contest component to quickly check visited URL's to determine whether they are relevant to a game, while at the same time preventing the list of relevant sites from unwanted exploitation.

Thus, a user may navigate his browser to a web site, and the contest component creates a hashed version of the URL associated with the web site. The hashed URL is provided to a site checking module within the contest device (which may include a Bloom filter), and the site checking module gives an indication about whether the site is relevant. If the hash is not identified as relevant, the contest component continues to wait for the next URL (e.g., it sleeps). If, however, the URL is a relevant URL, then a query is sent to the game server to confirm. The server returns an answer as to whether a key or the target object is on the site.

If the presence of a key or target is confirmed, whether from the web page itself, the URL and/or the information otherwise available to the contest component, the contest component may request additional web page elements from the contest server (STEP 826). As the sponsor receives the web page request and serves the requested web page (STEP 828) the additional page elements are sent to the contestant device (STEP 830) and presented simultaneously with the sponsor's web page such that it appears to the user that the additional elements are in fact part of the sponsor's site. In some embodiments, the additional functionality may be implemented as an overlay page that is sent from the contest server to the contest client component. The overlay may include contest objects such as an interactive puzzle, forms in which the user enters information and/or answers questions, and/or a target object such as a word or image. In some instances, the target object may already be present on the participating web page, however the additional functionality enhances the functionality of the object. For example, a web page may include numerous images that, without the addition of the contest component, are merely presented to the user in typical fashion. However, when identified as part of a web page participating in the contest, one (or some number) of the images may morph into another image, play audio, or initiate the presentation of additional contest clues or information when selected and rendered at the client (STEP 832). In some embodiments, additional functionality is generated by the contest component. Contest sponsors can identify aspects of their web sites of particular interest (e.g., a new product, an advertisement, or a timely article) and drive internet traffic to particular web content. This may be accomplished by selection of the page on which a target is located, hints or keywords used to locate the target, images or objects presented to contest participants, and so on.

In some embodiments, contest participants are organized into teams and the contest involves team competition. The assignment of participants to teams may occur, for example, before a competition begins, after a predetermined number of rounds in a competition, or after one competition is complete and for future competitions. In further embodiments, contestants are assigned to teams randomly or based on previous performances in prior contests. In some cases, contestants can be rated (e.g., assigned a rating based on the number of contests entered, the number of contests won, placement in prior contests, etc.) and the ratings used to assign contestants to teams. In other embodiments, contestants form teams themselves. In yet another embodiment, at least two contestants volunteer (or are selected) to be team captains and the team captains select contestants to be members for their team. Contestants can also be "traded" from one team to another team. Examples of a trade that one team (e.g., the team captain) can make for one contestant include, but are not limited to, a member of another team, points, and prizes. Contestants may be assigned or directed to teams based on contestant demographics and expressed interests.

A team competition can span multiple contests in which teams compete for the best record, point total or prize total over a predetermined period of time or number of contests. Moreover, teams (and individual contestants) may be organized into divisions. In this embodiment, teams with a rating, score, or historical prize pool above a predetermined total, for instance, are placed into a higher division. A "handicap" may also be applied to teams based on having a higher rating or score from previous contests.

In some embodiments, cooperation among team members is implemented through the contest component such that members of a team can view the progress of other team members in finding the participating web pages and/or the target object(s) as well as and communicate with each other using, for example, instant messaging.

In various embodiments, measures may be taken to reduce the possibility of collusion or fraud on the part of the contestants and/or the web site administrators who pay to host the target. For example, non-limiting examples of such measures include providing a number of targets across multiple web sites and/or domains; hiding information from web site administrators that would be useful for contestants; providing ranges for hosting of the target such that the web site administrator does not know when the target will appear at their web site; hiding the target from the web site administrator; using contest information unique to each contestant so that information provided to one contestant is not useful to other contestants; and/or introducing some element of randomness into the placement of the target.

Figure 9:
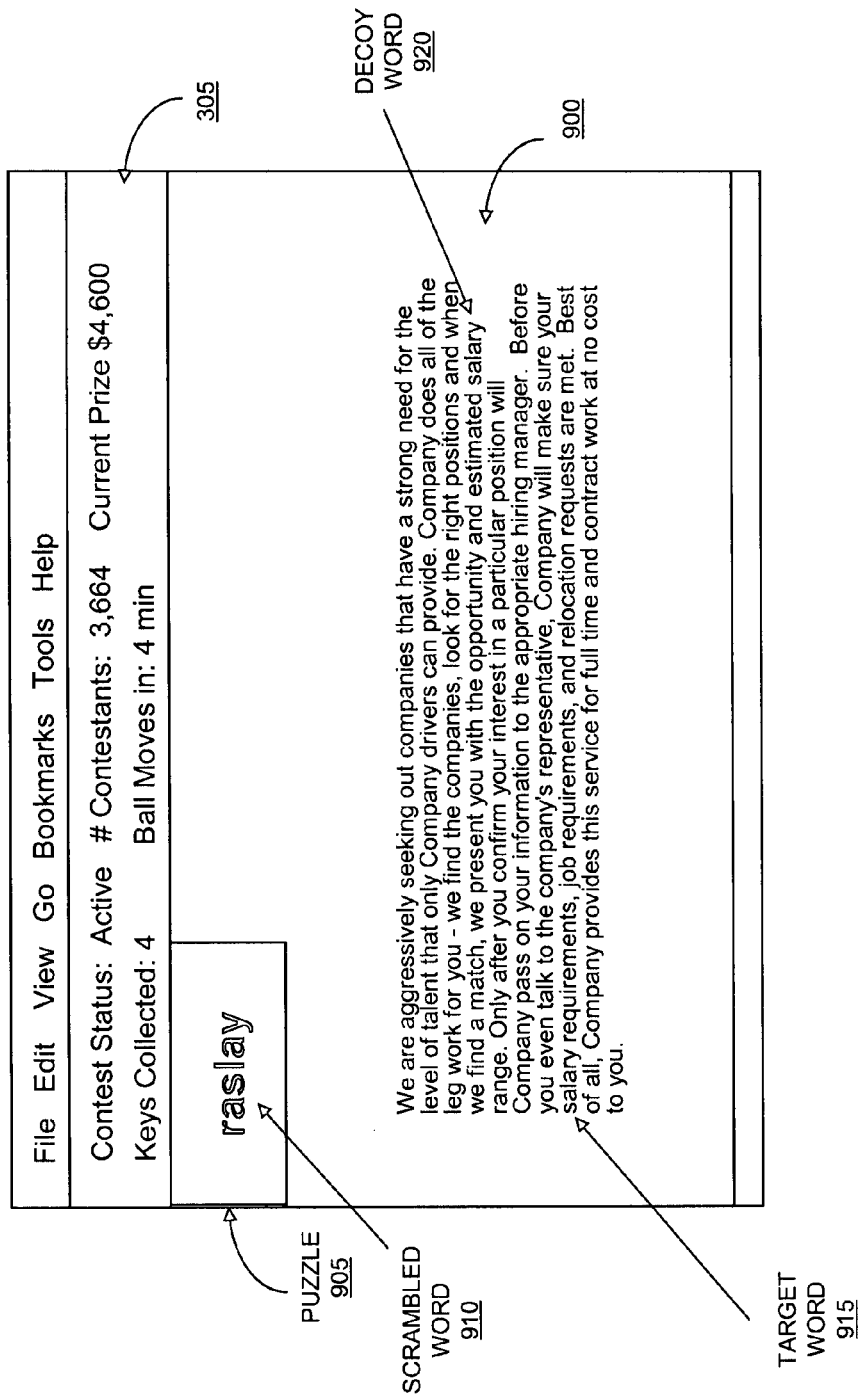
FIG. 9 is an example web site display according to an exemplary embodiment of the invention.
Figure 10:
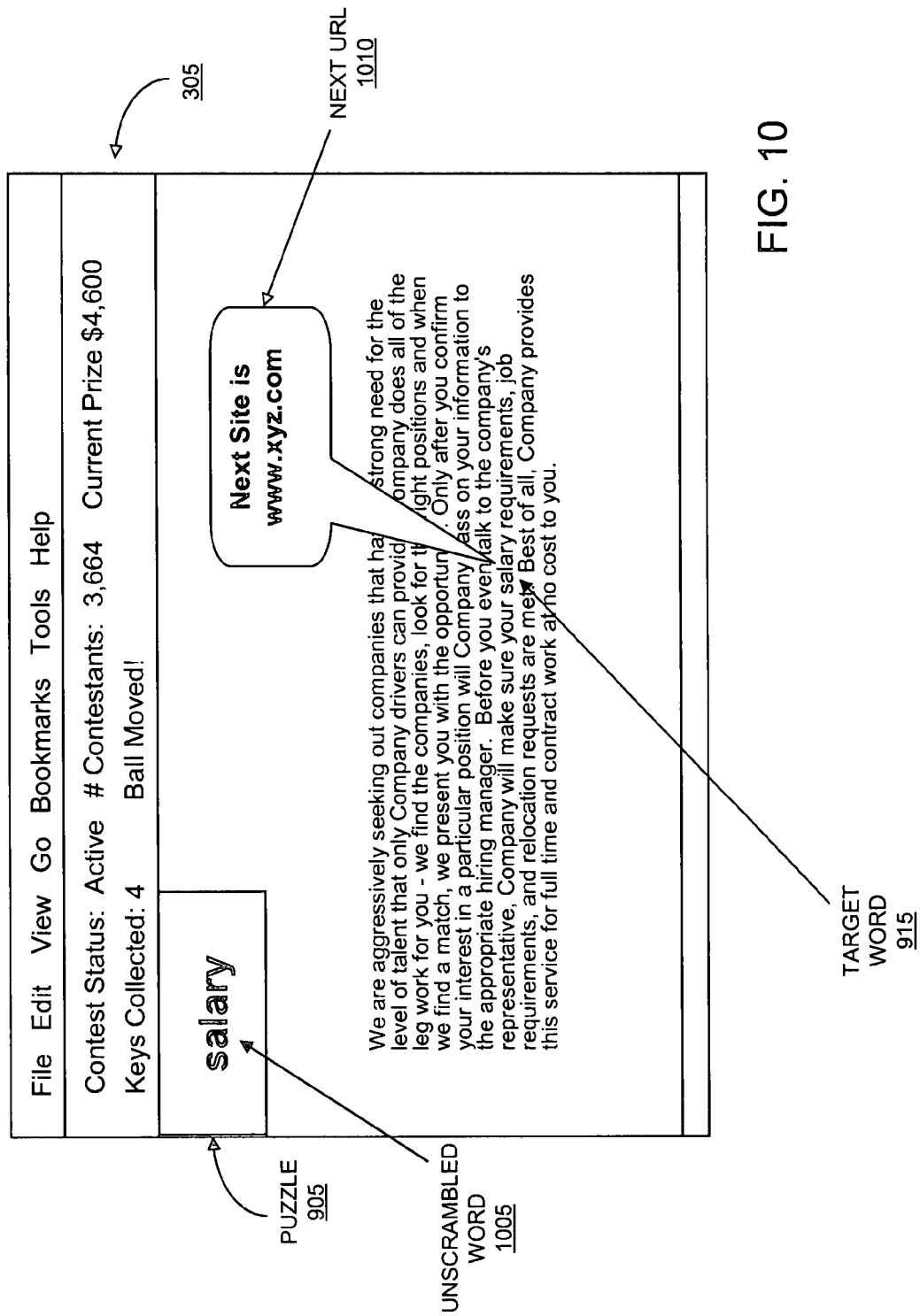
FIG. 10 is the web site display of FIG. 9 after a user has interacted with the web site display and completed a puzzle according to an exemplary embodiment of the invention.
Figure 11:
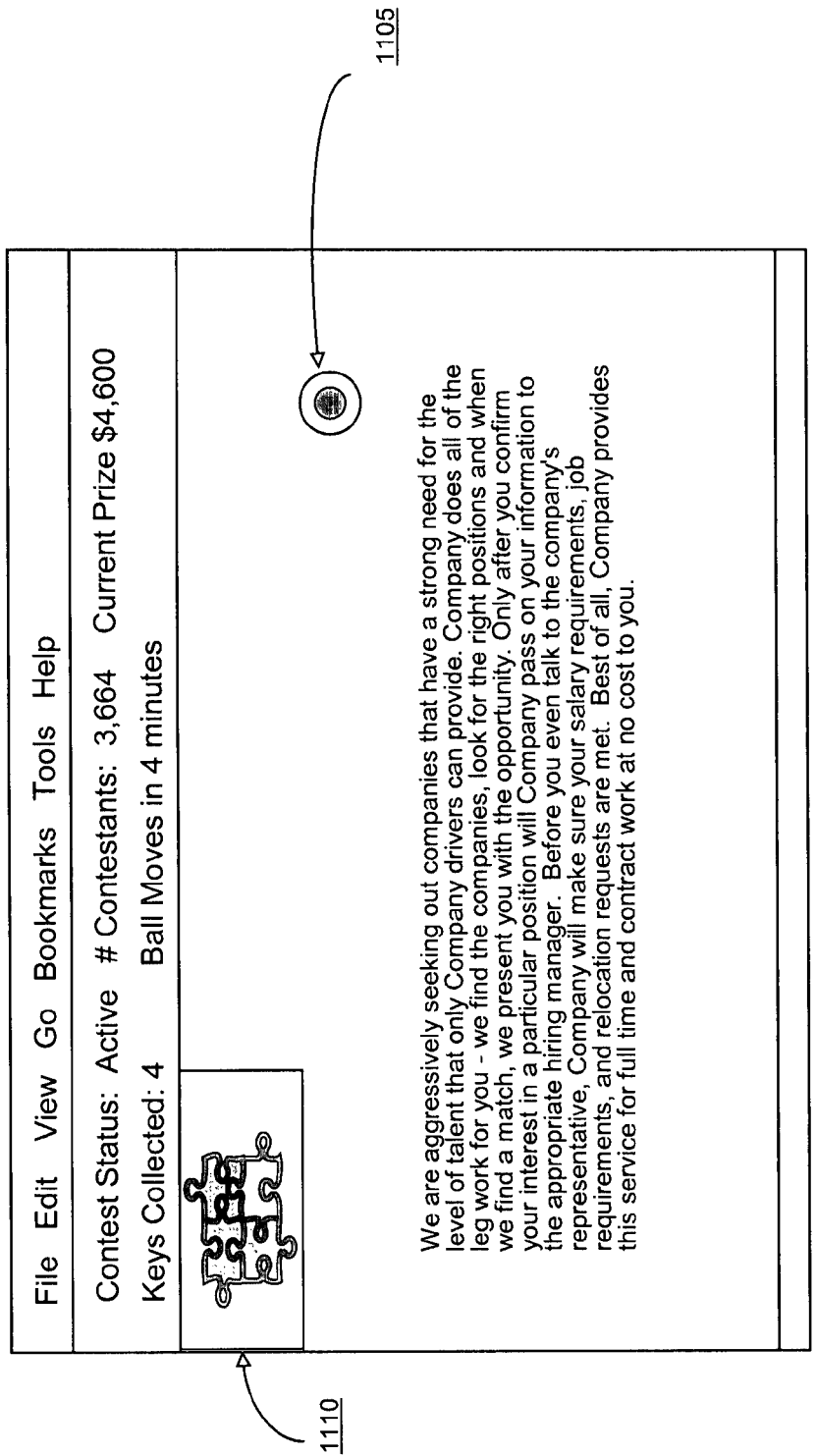
FIG. 11 is the web site display of FIG. 9 after a user has interacted with the web site display and found a target object according to an exemplary embodiment of the invention.

Generally, FIGS. 9, 10 and 11 illustrate exemplary contest states as viewed by contestants participating in an online (e.g., Internet) treasure hunt in which the contestants navigate among web sites to find a hidden (or in some cases moving) target object. For example, the target object may be a virtual "ball" that moves to, around and/or from web sites and therefore entices contestants to "follow the ball" in order to win a prize. In doing so, the ball generates traffic for the web sites that agree to host the ball, which in turn may increase sales, exposure of the web site and other means of increasing the effectiveness of the site. At any given time, the ball may be at a "location" (e.g., web site) that is known only to the contest administrators. The location of the ball may change at specified intervals and/or as the ball is discovered and attempts are made to "open" it. The ball may be "opened" with one or more "keys," for example, four keys. Opening the ball using the keys entitles a contestant to a prize. When the ball moves from one web site to another, a key is "left" on the site that previously hosted the ball for contestants to find. Thus contestants attempt to chase the ball, by searching the Internet for hints that will enable them to find keys to unlock the ball, and for the ball itself.

In this exemplary implementation, the functionality of online treasure hunt is provided without requiring technical changes to the functionality of the host web sites on which keys and balls are to be found. Sponsors request that the ball be hosted on their site, and contestants, with the appropriate contest component software play the game by searching the host web site. The host web site itself provides no technical functionality for the game, other than serving web pages to contestants just as it provides them to everyone else, as described above. The contest component and contest server provide the game functionality. This implementation simplifies participation by host web sites, and also reduces the information that host web sites may have that would enable them to collude with contestants.

Users download a contest component, which may be stand-alone software or preferably an addition or "plug-in" to an application such as a web browser. If the contest component is a plug-in, contestants may use a web browser (e.g., Internet Explorer or Mozilla Firefox) to participate. The plug-in enables the browser as a game client. The technology also may be extended to other devices that may be used to view content over a network, including mobile telephones, PDA's, game boxes, video players, and so on. It is preferred that challenge be as automated as possible, and componentized and customizable so as to vary the difficulty level as needed. This may require advance spidering of host web sites to determine word or other object count and to generate the links that eventually lead contestants to the key and/or ball.

Referring specifically to FIG. 9, a contestant visits a web page 900, in some cases based on hints provided as part of the contest. The contest component checks to see whether the domain or URL of the web site 900 is relevant to the contest (e.g., may be hosting a key or the ball for a contest). If the site is hosting a key or ball, the contestant is presented with a challenge and/or puzzle 905 via the contest component, which will allow the contestant to start searching for the key or ball. The puzzle may be any sort of puzzle, for example, in the form of a pixilated image, trivia question, word jumble 910, hangman or other brainteaser and the answer may be a hint to find the target object (e.g., text, image, audio, video or other content type) that is hidden on the host site. As time passes, additional hints may be given to facilitate solving the challenge (e.g., images become increasingly un-pixilated, jumbled words become unscrambled, additional letters are provided for hangman, etc.).

In one implementation in which a sponsor has obtained the opportunity to host the target object, a copy of the web sites associated with that sponsor (e.g., their entire domain) is downloaded and stored in a database on the contest server. The content of the various pages from the web site are analyzed by the server to determine an appropriate target object. For example, a word count distribution can be generated for the purpose of selecting a word or phrase that will be appropriately difficult to find and used in a puzzle or challenge on the site. In this example where the object is a word, a jumble may be created using that word. In other cases, the object is a graphical image, a puzzle may be created with all or a portion of the image. Multiple challenges, or hints for the original challenge may be created, so that it is possible to provide contestants with additional information when they become stuck and cannot complete the challenge or puzzle.

Answers to the puzzles generally refer to target objects hidden on hosting sites. For example, if the hosting site is an employment site and the target object is the word "salary," contestants may surf around the host web site until they find examples of the word "salary." In some implementations, there may be more than one instance of that object on the site, and any instance will suffice (e.g. if the object is the word "pickle" and the hosting site if www.wegmans.com, any occurrence of the word pickle on the site would be correct). Thus, in such cases, object selection of may take into account the number of instances of an object on the web site. In some embodiments, only one instance of the unscrambled word is the target word 915 and any other instances of the unscrambled word are decoys 920. In other implementations, some number (e.g., two, a random number, or even all) of the unscrambled words 1005 are all active target words 915.

In some embodiments, the contest component affirmatively alerts contestants when the challenge has been successfully completed, however in other cases there may be no such notification. There may also be challenges with multiple possible correct answers and part of the difficulty of the contest may determining which possible answer is the one required by the contest.

In some implementations, the contestant finds the object by placing the mouse cursor key over the object. In some embodiments, there may be a slight delay, such that the user must affirmatively hold the mouse cursor over the object. In other implementations, the contestant may need to click, or otherwise signal when the mouse is over the object. In each case, it is the contest component that recognizes that the contestant has found the object, and provides the contestant with the associated information regarding the object, hint, challenge and so on. Typically, the contest component is in communication with the game server to obtain the appropriate information to share with the contestant at the appropriate time.

Referring to FIG. 10, when a contestant solves the puzzle (e.g., unscrambles the word 1005) and finds the target object 915, contestants may then be presented with another challenge referencing another object on the site. Alternatively, the contestant may be provided with the hint 1010 to the location of the next object and/or a key indicating that they have successfully found the current web site and solved the puzzle. In some implementations, the contest administrator can place the ball at a specific site for a specific time period and/or "skip" a site (i.e., override the default site placement schedule.)

The key may be a code (e.g., numeric or alphanumeric value, word, picture, link, etc.). The contestant may be required to memorize the key or record it manually on his computer. The contest component, in some implementations, may store the key for the contestant. Upon obtaining a key, a contestant profile may be updated and the contestant's current status sent to the contest server, such that all contestants' status (or some number of top performers) can be disseminated to all the contestants. If the contestant is the first to solve that particular puzzle and uncover the next domain, the contestant's information can be updated to show that she has found the domain and/or received the key. The profile may also be utilized to determine which challenge is to be provided to a contestant, thereby allowing a site to host the ball multiple times and assuring that repeat visitors receive different puzzles each time. The profile information and keys may be encrypted and stored in such a manner that contestants may not be able to access this information directly.

Referring to FIG. 11, when the contestant reaches the target object on a site (or the contest period comes to a close), the contestant is presented with the key or the ball, 1105 if the ball 1105 is currently on that site. In some implementations, the contestant is presented with a further challenge such as a puzzle 1110 before or after being presented with the key or the ball. A picture, video and/or audio may be presented to the contestant once the puzzle is assembled that includes information and/or graphics provided by the sponsor of the site hosting the ball at the time that the game is won. If there are no more sponsors for a contest and the contest is still in progress, the ball can cycle through previous sponsors for that game (though ideally utilizing a different sub-page of their top level URL) in a random, FIFO or other configurable algorithm.

If the contestant finds the ball, she is prompted to "open" or "unlock" it by entering and/or presenting the keys collected from the preceding sites that hosted ball prior to its being found. If the contestant is able to successfully unlock the ball, she may be presented with a further challenge to solve within a limited time period (which may be configurable by an administrator). These challenges can be, for example, "slider" puzzles, a regular jigsaw, trivia questions or other puzzle type. The challenge may or may not be dependent on the keys. If the contestant solves the challenge, she can enter the keys necessary to unlock the ball. Contestants may be required to manually provide the values of the keys found in a number of preceding sites (where the number may be 2, 3, 4, 5 or more, and is configurable by a game administrator) to successfully unlock the ball, or the key values may be extracted from the contest component In some instances, once the ball is unlocked, the game is won, and the contestant can claim her prize, if any. If the contestant is unable to successfully unlock the ball, the ball moves to the next site in the list. The contestant is provided with the key associated with the current site and the address of the next web site to host the ball. In some embodiments, the contest continues even after one contestant has unlocked the ball as other contestants continue to look for and unlock the target object in an attempt to claim additional prizes.

If a contestant unlocks the ball and solves the puzzle, the contestant is informed that they are the winner, subject to verification of eligibility. The contestant may then be required to provide additional information, such as:

| Field | Description | Type | Required | Validation |
|---|---|---|---|---|
| First Name | First name of Contestant | Text | Yes | Less than 30 characters |
| Last Name | Last name of Contestant | Text | Yes | Less than 50 characters |
| Nick Name | Preferred handle of Contestant | Text | Yes | Less than 30 characters |
| Street Address Line 1 | Address of Contestant | Text | Yes | Less than 128 characters |
| Street Address Line 2 | Address of Contestant | Text | No | Less than 128 characters |
| City | City of the Contestant | Text | Yes | Less than 128 characters |
| State | State of the Contestant | Text | Yes | None |
| Zip Code/Postal Code | Zip/Postal code of Contestant | Text | No | Less than 10 characters |
| Telephone | Telephone Number of Contestant | Numeric | No | Less than 20 characters |
| Payment Method preference | Preferred method of being paid | Text | No | Less than 50 characters |
| Secret Question | Question to be displayed to verify identity in future | Drop Down Field | Yes | None |
| Secret Answer | Answer to Secret Question | Text Field | Yes | Less than 128 characters |

Other contestants are notified that the contest has ended, and the contest administrator may be notified about the potential winner. The contest administrator verifies eligibility of the winning contestant, and the validity of keys and the ball-opening challenge solution. For example, the contestant may be disqualified for reasons of their place of employment or other sponsor affiliations, cheating, not complying with the rules of the contest and/or other criteria as deemed pertinent by the contest administrator. If the contestant is not approved, the contest resumes. Notification of a resumed contest may occur, for example, via the contest component.

In general, any of the game parameters may be varied as a contest progresses in response to the length of time of the contest, the number of contestants, the amount of the prize, and/or other factors. Thus, in one implementation, the number of keys from preceding sites required to open the ball is changed over time. For example, if the contest continues for a long time, the number of keys required may be reduced. Alternatively, if the game continues for a long time, and the prize amount increases, then the number of preceding sites may be increased, to make it harder to win.

Figure 12:
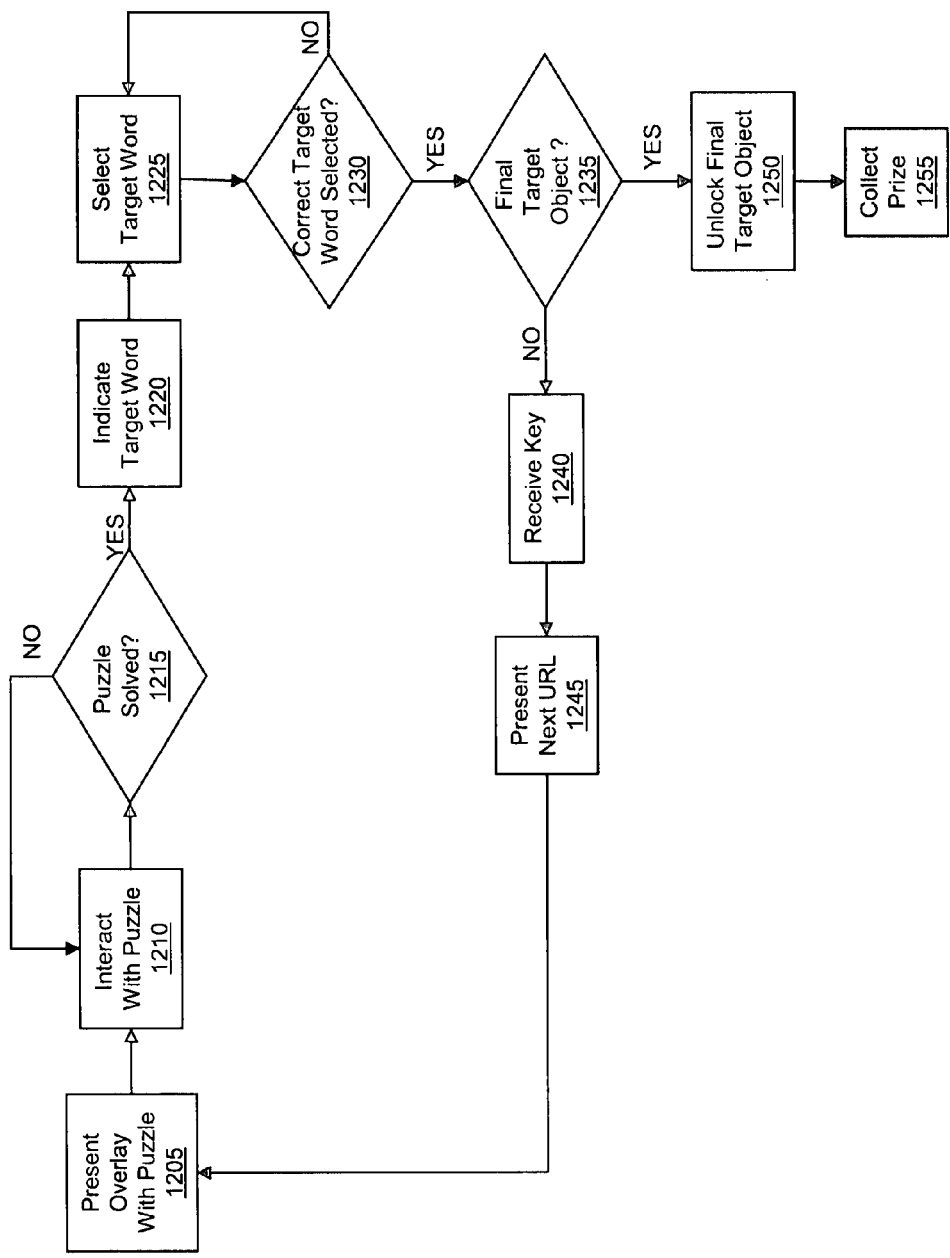
FIG. 12 is a flow chart of a process for implementing an ongoing, online contest according to an exemplary embodiment of the invention.

FIG. 12 illustrates one possible sequence of events for a contest in which contestants navigate to multiple web sites to find a target object. As described above, a contestant navigates to a web site using a browser application that includes the contest component. The contest component provides the additional contest functionality (STEP 1205) in the form of an overlay, for example, that includes a puzzle. In some cases, a domain or site may host multiple contest segments. In such cases, the puzzle served to the contestant can depend on the previous keys stored in her profile. For example, if a particular domain has hosted the ball four times (e.g., at four different web pages within a common domain), then the clue provided to a contestant upon landing at a site within the domain will depend on the keys (if any) that were already collected by the contestant at sites within this domain.

The contestant interacts with the puzzle (STEP 1210), and at various intervals (either timed or based on user commands) the contest component determines of the current state of the puzzle matches a predefined solution (STEP 1215). The solution may be stored on the client as part of the contest component or a data file retrieved by the contest component (e.g., an XML data file requested from the server when the puzzle was rendered) or it may be stored on the contest server and checked using HTTP commands between the client and the server. In some implementations, the determination step (STEP 1215) is left to the contestant, and the system may not indicate whether any one particular solution is correct. In such cases, it may be left to the contestant to determine if their solution is correct and what target may be indicated by her solution. If the puzzle is solved, the target word (or other object to be found on the web site) is indicated (1220). The contestant then searches for the target word throughout the web site (either on a particular page or within an entire domain) and selects the target (STEP 1125) by, for example, clicking on the word using a mouse.

If the correct target has been found and selected (STEP 1230), a determination is made as to whether the target is the last target for the contest (STEP 1235). If there are remaining objects to be found, the contestant receives a key for that site (STEP 1240). The contestant may be required to remember or record the key value. If the contestant is the leader (e.g., has more keys than any other contestant and/or is the closest to finding the last target object), the list of web sites is updated to include the current web site and in some cases broadcast to all of the contestants. The contestant's profile on the server may be updated to include information about the key that was found, and thus provided to other contestants via the contest component, for example.

The contestant is then presented with a URL at which the next target object can be found (STEP 1245) and the contest continues iteratively until the final target object is found and unlocked. If, however, the contestant has found the final target, she can unlock the object (STEP 1250) using the keys collected from the previously visited sites.

In some implementations, if the contestant finds the final object before she has collected the all of the keys needed to unlock it, she can either attempt to find the sites that are earlier in the list of hosting sites in an attempt to collect all the necessary keys, or she can wait until the ball has moved through more sites and follow it as it moves, collecting keys along the way, until she has enough keys to unlock the final target object.

Once the final target is found, the contestant is presented with a message stating that she has found the final target object and prompted to provide the keys to unlock it. The keys can be, for example, provided by the contestant are communicated to the server and tested by the server. If the keys are valid, the contestant can be provided with another challenge to be solved to win the game. If the keys are not valid, the user may be given a number of attempts (e.g., three attempts) to enter a valid key sequence. If not successful, the contestant is informed that the attempt to unlock the ball was unsuccessful, and encouraged to try again on the next site, and the contestant is provided with the key associated with the current site. Likewise, if the user is not successful at completing the challenge, the user is provided with the key associated with the current site, and is encouraged to try again on the next site. A contestant's profile is updated to reflect the newly found key. In this implementation, failure to unlock the ball, or failure to complete the challenge in the specified period of time causes the ball to move to the next site, and the contest continues.

In some instances, a final target remains on a web site for a period of time or indefinitely once it is found and any puzzles or challenges needed to unlock the target are solved. In such cases, contestants effectively "race" to find the last target and, in order to collect the prize, unlock the target before other contestants. As such, not only do the contestants need to find the targets, but also solve any puzzles associated with the targets before the other contestants. As such, contestants having certain skills and/or knowledge may have certain advantages in the contest.

In some embodiments, an individual contestant or groups of contestants may recruit additional contestants as team members if, for example, the new team member has knowledge or skills that may assist the contestants find and/or unlock the target object. In particular, a contestant may have successfully found all the target objects but struggle to solve a puzzle or puzzles required to collect the prize. In such cases, the contestant may advertise for or otherwise recruit another contestant (or even an individual not currently participating in the contest) to assist her in solving the puzzle. For example, if the final puzzle involves mathematics, the contestant may offer a portion of the prize money to other contestants and/or friends (even in some cases members of the general public or people who have advertised themselves and their capabilities for such purpose) who are skilled in mathematics if they "join" her team and can help solve the puzzle.

In some cases, individuals that routinely solve puzzles on behalf of other contestants (or even during their own participation in a contest) may post their availability on a website (e.g., the contest website). The individuals may, for example, post one or more areas of expertise, the number of puzzles successfully solved, the percentage of puzzles solved, their average fees (either as a percentage of the prize or in absolute dollar amounts), as well as other information. Thus, contestants looking for people that have specific skills or knowledge and may have solved puzzles in the past can find and contact these individuals, and in some cases negotiate a bounty for joining their team and successfully solving the puzzle. In other embodiments, contestants can post help-wanted type advertisements on the contest website such that individuals with useful knowledge can review the opportunities to participate in the prizes. In some instances, especially where individuals achieve notoriety for solving puzzles, contestants may bid against each other (e.g., in an auction format) for the services of the individuals.

Figure 13:
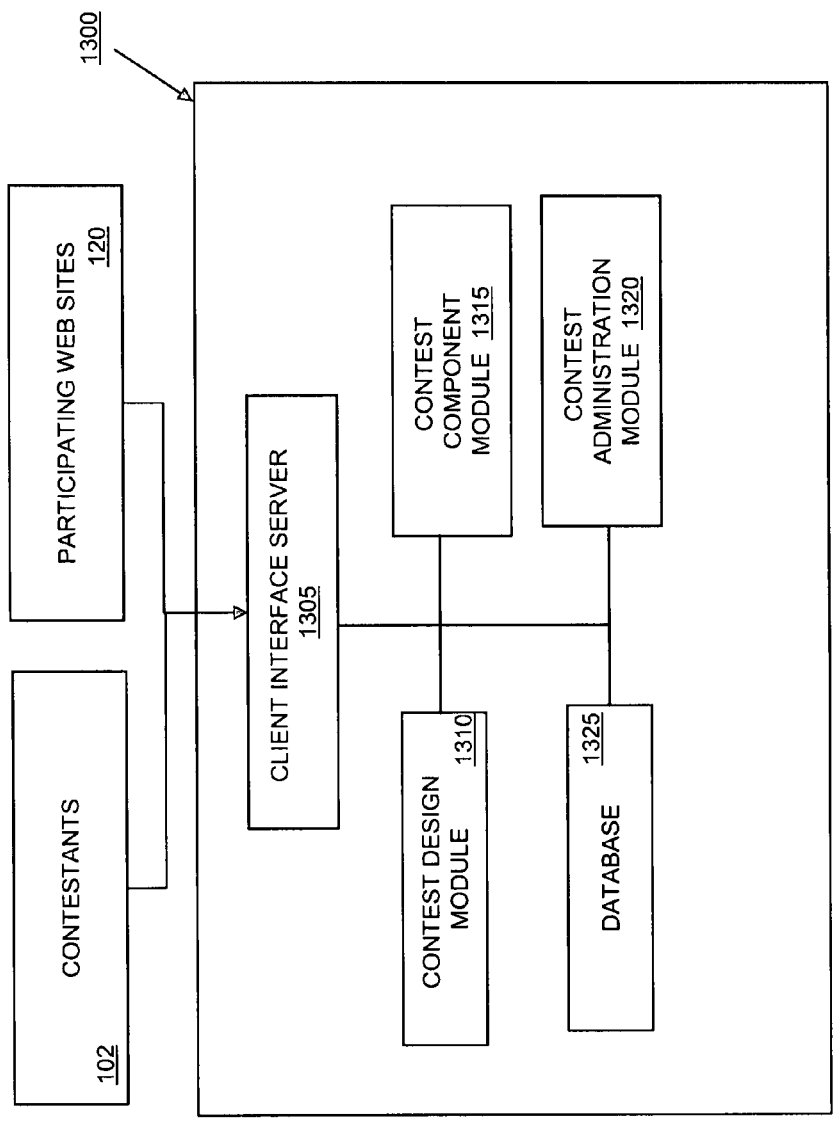
FIG. 13 is a block diagram of a contest system according to an embodiment of the invention.

Referring to FIG. 13, in one embodiment, an exemplary contest administration system 700 can be used to provide web sites and contestants with the contest components information needed to participate in the contests. In one example, one or more contest servers included in the system 1300 include a communication server 1302, a contest design module 1304, a contest component module 1306, a contest administration module 1308, and a database module 1310. The contest server may be implemented, for example, as a J2EE web application, involving servlets and JSPs backed by an EJB-based interface to persistent storage. The communication server 1302 provides a conduit through which the web sites and contestants interact, for example, to provide hints regarding the location of a hidden contest object, answers to questions, prizes, and advertisements. In some embodiments, the communication server is or operates as part of the server as described above, whereas in other cases the communication server may be a separate server, which may be operated by and/or outsourced to an application service provider (ASP), internet service provider (ISP), or other third-party. The communication server facilitates HTTP/S requests and responses, Java messages, SMTP messages, POP3 messages, instant messages, RSS feeds, as well as other electronic messages exchanged among users of the investment information domain.

The communication server 1302 interacts with web sites and contestant devices. The communication server 1302 is preferably implemented on one or more server class computers that have sufficient memory, data storage, and processing power and that run a server class operating system (e.g., SUN Solaris, GNU/Linux, and the MICROSOFT WINDOWS family of operating systems). Other types of system hardware and software than that described herein may also be used, depending on the capacity of the device and the number of web sites, contests, and contestants. For example, the communication server 1302 may be or may be part of a logical group of one or more servers such as a server farm or server network. As another example, there could be multiple servers that may be associated or connected with each other, or multiple servers could operate independently, but with shared data. In a further embodiment and as is typical in large-scale systems, application software could be implemented in components, with different components running on different server computers, on the same server, or some combination.

The system also includes a contest design module 1304, which may be used to define the various parameters associated with a contest. For example, a contest administrator may use the contest design module 1304 to enter or identify the URLs of the participating web sites, provide email listings of potential contestants, and provide a contest start and end date. Further, the design module 1304 may be used to select one or more contest objects and set the attributes of the contest object. For example, if the contest object is a "ball" that will appear and disappear at random on a series of web pages, the design module can be used to assign the ball to the contest, set visual attributes such as size and color, rendering attributes, such as if a specific contest component is required to see the object, and movement attributes such as how long the object remains visible on a particular web page. If the contest is based on a compilation of numerous objects, the design module 1304 facilitates the selection and integration of the individual elements into a complete contest.

In embodiments where multiple web pages are participating in the contest, the design module 1304 can be used to allocate certain date/time segments to particular participants (if, for example, they paid a premium for a particular time), or instructions that certain web sites are to be "selected" at a higher rate than others, possibly based on paying higher participation fees.

The system 1300 also includes a contest component module 1306 which provides the repository for the contest components that are used to develop and deliver a contest, including, for example, the contest component that can be provided to contestants if needed. The contest component module 1306 also maintains the rules, design parameters, and implementation procedures needed to use the contest component as part of a contest. The component module 706 includes or is provided with the necessary information about how to implement the contest.

The system 1300 also includes a contest administration module 1308 which is used to monitor and administer ongoing contests, and implement the methods and steps described above. For example, the contest administration module 1308 facilitates the initial registration of one or more web sites as participants in the contest, and, in some cases, allows the participants to reserve for a fee (on, as an example, a first-come-first-serve basis) or bid to become sponsors of a contest, and/or for particular date/time segments of a contest. The contest administration module 1308 also implements the rules and parameters defined by the contest components used to build the contest, such that the contest is executed as advertised. As an example, a contest may ask contestants to find a hidden target, and the hidden target moves to a new web site every hour. In such a case, the contest administration module 1308 modifies the contest component provided to the web page that initially included the hidden object such that the object no longer appears on that site. In addition, the contest administration module 1308 identifies the subsequent web site into which the hidden object is to included, and, upon receiving a request for the component, provides the hidden object component to the new web site, and/or hints or other information to contestants visiting the previous host web site.

The system 1300, in certain embodiments, also includes a database module 1310, which stores data related to the contests, contest parameters, contest objects, participating web sites, contestants, prizes, and the like in one or more databases. For instance, the database module 710 may store information relating to the web sites participating in the contests, the contestants, prizes, stored content, user information, server availability, communication logs, and web traffic information. The database module 1310 may also contain separate databases for contestant data, web site participant data, fee allocations, user permissions and security information, and others. The database module 1310 provides data to the contest administration module 1306 for inclusion in messages, numerical representations of the participating web pages, stored procedures, and applications (both residing on the client and/or the server). The database module 1310 can be implemented using, for example, the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif.

In one embodiment, the contest server 1300 facilitates the assignment of one or more host web sites to a contest. The administrator of a prospective host web site registers her web site with the contest server. This may include the administrator identifying the web site and any particular pages that the administrator would like to draw attention to, or on which the target should be located.

In one embodiment, the contest server 1300 downloads a copy of the prospective host's web site and web pages, and identifies one or more potential hints and or target locations. The contest server 1300 may also provide the web site administrator with a graphical chart representing the registered web site (e.g., an automatically or manually generated "site map") so that the administrator can identify web pages or portions of web pages for use as hints or a target location. For example, the contest server 1300 may identify images or portions of images to be used as a hint. The contest server 1300 may provide the administrator with choices of potential hints to select from or exclude. The contest server 1300 may request that the prospective host administrator generate hints. Again, hints can be in any format, including, without limitation, text, graphics, sound, video, etc.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A system for modifying the functionality of a web page to allow the operation of an online scavenger hunt upon the web page, the system comprising:
client software running in a web browser for use by a plurality of contestants participating in the online scavenger hunt, wherein the client software presents added functionality to browsed web sites participating in the online scavenger hunt and determines the current status of each of the plurality of contestants in the online scavenger hunt, wherein the added functionality comprises presentation of a target object; and
a client interface server in communication with the client software, the client interface server for determining if the web browser is presenting a web site participating in the online scavenger hunt, and if so, transmitting instructions to the client software to present such added functionality with the browsed web sites.

2. The system of claim 1 wherein the client software comprises a java applet.

3. The system of claim 1 wherein the client software comprises a contest information screen.

4. The system of claim 3 wherein the information screen comprises asynchronous JavaScript.

5. The system of claim 1 wherein the client software comprises a toolbar.

6. The system of claim 1 wherein the client software is configured according to the Wireless Application Protocol standard.

7. The system of claim A system for modifying the functionality of a web page to allow the operation of an online scavenger hunt upon the web page, the system comprising:
client software running in a web browser for use by a plurality of contestants participating in the online scavenger hunt, wherein the client software presents added functionality to browsed web sites participating in the online scavenger hunt and determines the current status of each of the plurality of contestants in the online scavenger hunt, wherein the added functionality comprises presentation of a target object; and
a client interface server in communication with the client software, the client interface server for determining if the web browser is presenting a web site participating in the online scavenger hunt, and if so, transmitting instructions to the client software to present such added functionality with the browsed web sites. wherein the online scavenger hunt comprises a scavenger hunt in which participants navigate to a plurality of web sites in search of the target object.

8. The system of claim A system for modifying the functionality of a web page to allow the operation of an online scavenger hunt upon the web page, the system comprising:
client software running in a web browser for use by a plurality of contestants participating in the online scavenger hunt, wherein the client software presents added functionality to browsed web sites participating in the online scavenger hunt and determines the current status of each of the plurality of contestants in the online scavenger hunt, wherein the added functionality comprises presentation of a target object; and
a client interface server in communication with the client software, the client interface server for determining if the web browser is presenting a web site participating in the online scavenger hunt, and if so, transmitting instructions to the client software to present such added functionality with the browsed web sites, wherein the target object further comprises an interactive puzzle.

9. The system of claim A system for modifying the functionality of a web page to allow the operation of an online scavenger hunt upon the web page, the system comprising:

client software running in a web browser for use by a plurality of contestants participating in the online scavenger hunt, wherein the client software presents added functionality to browsed web sites participating in the online scavenger hunt and determines the current status of each of the plurality of contestants in the online scavenger hunt, wherein the added functionality comprises presentation of a target object; and a client interface server in communication with the client software, the client interface server for determining if the web browser is presenting a web site participating in the online scavenger hunt, and if so, transmitting instructions to the client software to present such added functionality with the browsed web sites, wherein the added functionality further comprises presentation of status information.

10. The system of claim 9 wherein the status information comprises one or more of a number of participants participating in the online scavenger hunt, a score board comprising current leaders of the online scavenger hunt or a prize for winning the online scavenger hunt.

11. The system of claim 1 wherein the added functionality facilitates communication among participants in the online scavenger hunt.

12. The system of claim 11 wherein the communication among participants comprises electronic messaging.

13. The system of claim 1 further comprising a data storage module for storing identifiers of the web sites participating in the online scavenger hunt.

14. The system of claim 13 wherein the client software further transmits browser history data from the web browser to the client interface server for storage in the data storage module.

15. The system of claim 1 wherein the client interface server determines if the web browser is presenting a web site participating in the online scavenger hunt by comparing identifiers of browsed web sites with a list of identifiers of the web sites participating in the online scavenger hunt.

16. The system of claim 15 wherein the client software obfuscates the identifiers of the browsed web sites.

17. The system of claim 16 wherein the browsed web sites are obfuscated using a Bloom filter.

* * * * *